United States Patent
Lee et al.

(10) Patent No.: US 11,966,348 B2
(45) Date of Patent: Apr. 23, 2024

(54) REDUCING COUPLING AND POWER NOISE ON PAM-4 I/O INTERFACE

(71) Applicant: NVIDIA Corp.

(72) Inventors: Donghyuk Lee, Cedar Park, TX (US); James Michael O'Connor, Austin, TX (US)

(73) Assignee: NVIDIA Corp., Santa Clara, CA (US)

( * ) Notice: Subject to any disclaimer, the term of this patent is extended or adjusted under 35 U.S.C. 154(b) by 1133 days.

(21) Appl. No.: 15/929,094

(22) Filed: Jan. 28, 2019

(65) Prior Publication Data

US 2020/0242062 A1    Jul. 30, 2020

(51) Int. Cl.
G06F 13/12    (2006.01)
G06F 13/40    (2006.01)
G06F 13/42    (2006.01)

(52) U.S. Cl.
CPC ...... G06F 13/4009 (2013.01); G06F 13/4045 (2013.01); G06F 13/4282 (2013.01)

(58) Field of Classification Search
CPC .................................................. G06F 13/4009
See application file for complete search history.

(56) References Cited

U.S. PATENT DOCUMENTS

| | | |
|---|---|---|
| 4,623,223 A | 11/1986 | Kempf |
| 4,667,337 A | 5/1987 | Fletcher |
| 4,739,323 A | 4/1988 | Miesterfeld et al. |
| 4,742,349 A | 5/1988 | Miesterfeld et al. |
| 5,377,020 A | 12/1994 | Smitt |
| 5,487,665 A | 1/1996 | Lechner et al. |
| 5,572,736 A | 11/1996 | Curran |
| 5,833,340 A | 11/1998 | Yoshikawa et al. |
| 5,856,980 A * | 1/1999 | Doyle ............ H03M 5/20 375/264 |
| 5,890,005 A | 3/1999 | Lindholm |
| 6,046,943 A | 4/2000 | Walker |
| 6,285,300 B1 | 9/2001 | Colon-Bonet |
| 6,335,718 B1 | 1/2002 | Hong et al. |
| 6,348,915 B1 | 2/2002 | Yamashita et al. |
| 6,400,633 B1 | 6/2002 | Al-Shamma et al. |
| 6,442,077 B2 | 8/2002 | Shin |
| 6,489,900 B2 | 12/2002 | Shin et al. |
| 6,604,120 B1 | 8/2003 | De |

(Continued)

FOREIGN PATENT DOCUMENTS

DE    102019108205 A1    10/2019
DE    102019118340 A1    1/2020
(Continued)

OTHER PUBLICATIONS qww.electronics-tutorials.ws, binary decoder, Feb. 2014, pp. 1-5 (Year: 2014).*

(Continued)

*Primary Examiner* — Henry Tsai
*Assistant Examiner* — Dean Phan
(74) *Attorney, Agent, or Firm* — Rowan TELS LLC

(57) ABSTRACT

Methods of operating a serial data bus divide series of data bits into sequences of one or more bits and encode the sequences as N-level symbols, which are then transmitted at multiple discrete voltage levels. These methods may be utilized to communicate over serial data lines to improve bandwidth and reduce crosstalk and other sources of noise.

17 Claims, 16 Drawing Sheets

(56) References Cited

U.S. PATENT DOCUMENTS

| | | | |
|---|---|---|---|
| 6,717,990 B1 | 4/2004 | Abousleman | |
| 6,877,050 B2 | 4/2005 | Kanzaki et al. | |
| 7,022,736 B2 | 4/2006 | Neuner et al. | |
| 7,061,408 B2 | 6/2006 | Poechmueller | |
| 7,082,489 B2 | 7/2006 | Yeh et al. | |
| 7,135,996 B1 | 11/2006 | Lo et al. | |
| 7,149,955 B1 | 12/2006 | Sutardja et al. | |
| 7,188,263 B1 | 3/2007 | Rubinstein et al. | |
| 7,356,632 B2 | 4/2008 | Yeh et al. | |
| RE40,864 E | 7/2009 | Hong et al. | |
| 7,620,116 B2 | 11/2009 | Bessios et al. | |
| 7,782,682 B2 | 8/2010 | Matsuzaki et al. | |
| 8,022,726 B2 | 9/2011 | Candage et al. | |
| 8,022,736 B2 | 9/2011 | Chang et al. | |
| 8,181,101 B2 | 5/2012 | Shen et al. | |
| 8,189,263 B1 | 5/2012 | Wang et al. | |
| 8,359,498 B1 | 1/2013 | Sutardja et al. | |
| 8,984,380 B2 | 3/2015 | Vijayaraghavan et al. | |
| 9,184,906 B1 | 11/2015 | Min et al. | |
| 9,231,704 B1 | 1/2016 | Zhou et al. | |
| 9,240,907 B2 | 1/2016 | Wang | |
| 9,244,763 B1 | 1/2016 | Kankani et al. | |
| 9,548,858 B1 | 1/2017 | Cirit et al. | |
| 9,564,990 B1 | 2/2017 | Tiruvur et al. | |
| 9,853,769 B1 | 12/2017 | Farjad et al. | |
| 9,942,063 B2 | 4/2018 | Mendel | |
| 9,978,171 B2 | 5/2018 | Bolz et al. | |
| 10,312,896 B2 | 6/2019 | Kim et al. | |
| 10,424,074 B1 | 9/2019 | Uralsky et al. | |
| 10,491,435 B2 | 11/2019 | Lee et al. | |
| 10,581,645 B1 | 3/2020 | Song et al. | |
| 10,599,606 B2 | 3/2020 | Lee et al. | |
| 10,657,094 B2 | 5/2020 | Lee et al. | |
| 10,657,306 B1 | 5/2020 | Ma et al. | |
| 10,699,427 B2 | 6/2020 | Uralsky et al. | |
| 10,979,176 B1 | 4/2021 | Sudhakaran et al. | |
| 2003/0035497 A1 | 2/2003 | Gorecki et al. | |
| 2003/0076718 A1* | 4/2003 | Rolandi | G11C 11/5642 365/200 |
| 2003/0108134 A1 | 6/2003 | Stonick et al. | |
| 2004/0114692 A1 | 6/2004 | Matsumoto | |
| 2004/0153318 A1 | 8/2004 | Chamberlain | |
| 2005/0086417 A1 | 4/2005 | Meyer et al. | |
| 2005/0089126 A1 | 4/2005 | Zerbe et al. | |
| 2005/0099325 A1 | 5/2005 | Bessios | |
| 2005/0185281 A1 | 8/2005 | Perlin et al. | |
| 2006/0109917 A1 | 5/2006 | Fonseka et al. | |
| 2006/0139186 A1 | 6/2006 | Hoyer | |
| 2006/0280272 A1 | 12/2006 | Stojanovic | |
| 2007/0203962 A1 | 8/2007 | Hirairi | |
| 2008/0181331 A1 | 7/2008 | Casper et al. | |
| 2008/0262855 A1 | 10/2008 | Mehrotra et al. | |
| 2009/0193319 A1 | 7/2009 | Shen et al. | |
| 2009/0323722 A1 | 12/2009 | Sharma | |
| 2010/0174844 A1 | 7/2010 | Chu | |
| 2010/0214138 A1 | 8/2010 | Hollis | |
| 2010/0299440 A1 | 11/2010 | Meyer et al. | |
| 2011/0264719 A1 | 10/2011 | Mortensen | |
| 2012/0110255 A1 | 5/2012 | Meyer et al. | |
| 2012/0144161 A1 | 6/2012 | Elliott | |
| 2012/0204082 A1 | 8/2012 | Shen et al. | |
| 2012/0206280 A1 | 8/2012 | Abbasfar et al. | |
| 2012/0250746 A1 | 10/2012 | Sonntag | |
| 2013/0226982 A1 | 8/2013 | Yu | |
| 2014/0153620 A1 | 6/2014 | Longo et al. | |
| 2014/0173296 A1 | 6/2014 | Muff et al. | |
| 2014/0281075 A1 | 9/2014 | Hollis | |
| 2014/0298458 A1 | 10/2014 | Lewis et al. | |
| 2014/0358979 A1 | 12/2014 | Singh | |
| 2015/0137789 A1 | 5/2015 | Furtner | |
| 2015/0235634 A1 | 8/2015 | Liu et al. | |
| 2016/0013958 A1 | 1/2016 | Mishra et al. | |
| 2016/0164705 A1 | 6/2016 | Whitby-Strevens | |
| 2016/0173134 A1 | 6/2016 | Kwon et al. | |
| 2016/0373557 A1 | 12/2016 | Sikkink et al. | |
| 2017/0075854 A1 | 3/2017 | Hollis | |
| 2017/0207908 A1 | 7/2017 | Cirit et al. | |
| 2017/0220518 A1 | 8/2017 | Sengoku et al. | |
| 2017/0272285 A1 | 9/2017 | Shokrollahi et al. | |
| 2017/0310529 A1 | 10/2017 | Yang et al. | |
| 2017/0373887 A1 | 12/2017 | Ho | |
| 2018/0091189 A1 | 3/2018 | Chada et al. | |
| 2018/0091335 A1 | 3/2018 | Schnizler | |
| 2018/0123839 A1* | 5/2018 | Chung | H03M 7/30 |
| 2019/0199560 A1 | 6/2019 | Bossard et al. | |
| 2019/0303340 A1 | 10/2019 | Lee et al. | |
| 2019/0305765 A1 | 10/2019 | Lee et al. | |
| 2019/0305995 A1 | 10/2019 | Lee et al. | |
| 2020/0050923 A1 | 2/2020 | Patney et al. | |
| 2020/0151289 A1 | 5/2020 | Sikka et al. | |
| 2020/0175392 A1 | 6/2020 | Tang et al. | |
| 2020/0210276 A1 | 7/2020 | Sullivan et al. | |
| 2020/0210805 A1 | 7/2020 | Drozdowski et al. | |

FOREIGN PATENT DOCUMENTS

| | | |
|---|---|---|
| DE | 102019123711 A1 | 3/2020 |
| EP | 3167579 B1 | 6/2018 |
| KR | 20010065770 A | 7/2001 |
| KR | 100321164 B1 | 3/2002 |
| WO | 2015077606 A1 | 5/2015 |

OTHER PUBLICATIONS www.edaboard.com, how to make an 8-3 encoder using 4-2 encoders, Jul. 2010, pp. 1-4 (Year: 2010).*

U.S. Appl. No. 16/557,637, issued Aug. 30, 2019, Sunil Sudhakaran.

AN 835 PAM4 Signaling Fundamentals by INTEL 03122019.

Hossain et al., Channel-Adaptive ADC and TDC for 28 GB/s PAM-4 Digital Receiver.

Im et al., A 40-to-56 GB/s PAM-4 Receiver With Ten-Tap Direct Decision-Feedback Equalization in 16-nm FinFET.

Khandelwal et al. DesignCon 2016 Year 2016.

Low Power Bus Transform Coding for Multi Level Signals 2006 ZAMAN.

P. S. Teja, "Design of Radix-8 Booth Multiplier Using Koggestone Adder for High Speed Arithmetic Applications," Emerging Trends in Electrical, Electronics & Instrumentation Engineering: An international Journal (EEIEJ), vol. 1, No. 1, Feb. 2014 (Year: 2014).

Pupalaikis et al., Designcon 2017, Inphi, 2017, (Year: 2017).

S. Samavi, "High Radix Multipliers," Jan. 2014, retrieved from https://www.researchgate.net/publication/262836009 (Year: 2014).

Space Coding Applied to High Speed Chip FARZAN 2004.

Zhang et al., PAM4 Signalling for 56G Serial Link Applications—A Tutorial (Year: 2016).

Acquaviva, Andrea, et al., A Spatially-Adaptive Businterface for Low-Switching Communication, ISLPED '00, pp. 238-240, Rapallo, Italy., Feb. 2020.

Arnold, J.S., et al., Design of tightly-coupled multiprocessing programming, IBM Systems Journal, vol. 13, Issue: 1, pp. 60-87, 1974.

Baek, Kwang-Hyun, et al., A Low Energy Encoding Technique for Reduction of Coupling Effects in SoC Interconnects, Proc. 43rd IEEE Midwest Symp. on Circuits and Systems, pp. 80-83, Lansing MI. Aug. 11, 2000.

Benini, Luca, et al., Address Bus Encoding Techniques for System-Level Power Optimization, Proceedings Design, Automation and Test in Europe, IEEE, Paris, France, Feb. 1998.

Benini, Luca, et al., Asymptotic Zero-Transition Activity Encoding for Address Busses in Low-Power Microprocessor-Based Systems, Proceedings Great Lakes Symposium on VLSI, IEEE, Urbana-Champaign, IL, USA, pp. 77-82, Mar. 1997.

Benini, Luca, et al., Power Optimization of Core-Based Systems by Address Bus Encoding, IEEE Transactions On Very Large Scale Integration (VLSI) Systems, vol. 6, No. 4, Dec. 1998, pp. 554-562.

Benini, Luca, et al., System-Level Power Optimization: Techniques and Tools, ISLPED99, San Diego, CA, USA, 1999, pp. 288-293.

(56) References Cited

OTHER PUBLICATIONS

Bishop, Benjamin, et al., A Low-Energy Adaptive Bus Coding Scheme, Proceedings IEEE Computer Society Workshop on VLSI 2001. Emerging Technologies for VLSI Systems, Orlando, FL, USA, Apr. 2001, pp. 118-122.
Campbell, John E., et al., Design Considerations for a VLSI Microprocessor, IBM J. Res. Develop. vol. 26 No. 4,. Jul. 1982, pp. 454-463.
Canegallo, Roberto, et al., Low Power Techniques for FLASH Memories, ISCAS 2001. The 2001 IEEE International Symposium on Circuits and Systems (Cat. No.01CH37196), May 2001, Sydney, NSW, Australia, IV-494-IV497.
Catthoor, F., et al., Global Communication and Memory Optimizing Transformations for Low Power Signal Processing Systems, Proceedings of 1994 IEEE Workshop on VLSI Signal Processing, La Jolla, CA, USA, Oct. 1994, pp. 178-187.
Chandrakasan, Anantha P., et al., A Low-Power Chipset for a Portable Multimedia I/O Terminal, IEEE Journal of Solid-State Circuits. vol. 29, No. 12, Dec. 1994, pp. 1415-1428.
Chandrakasan, Anantha P., et al., Low-Power CMOS Digital Design, IEEE Journal of Solid-State Circuits. vol. 27, No. 4. Apr. 1992, pp. 473-484.
Chandrakasan, Anantha P., et al., Minimizing Power Consumption in Digital CMOS Circuits, Proceedings of the IEEE, vol. 83, No. 4, Apr. 1995, pp. 498-523.
Chandrakasan, Anantha P., et al., Optimizing Power Using Transformations, IEEE Transactions On Computer-Aided Design of Integrated Circuits and Systems, vol. 14, No. 1, Jan. 1995, pp. 12-31.
Chang, Naehyuck, et al., Bus Encoding for Low-Power High-Performance Memory Systems, DAC '00: Proceedings of the 37th Annual Design Automation Conference, Jun. 2000, pp. 800-805.
Chang, Naehyuck, et al., Dual-Mode Low-Power Bus Encoding for High-Performance Bus Drivers, Conference: TENCON 99. Proceedings of the IEEE Region 10 Conference, vol. 2, Jan. 2000, pp. 876-879.
Chang, You-Sung, et al., Conforming Inverted Data Store for Low Power Memory, Proceedings. 1999 International Symposium on Low Power Electronics and Design (Cat. No.99TH8477), Aug. 1999, San Diego, CA, USA.
Chao, H.H., et al., Designing the Micro370, IEEE Design & Test, Jun. 1987, pp. 32-40.
Chatterjee, Pallab, ULSI CMOS—The Next Ten years, Microelectronic Engineering 19 (1992), pp. 3-8.
Cheng, Wei-Chung, et al., Memory Bus Encoding for Low Power: A Tutorial, Proceedings of the IEEE 2001. 2nd International Symposium on Quality Electronic Design, Mar. 2001, San Jose, CA, USA, pp. 199-204.
Cheng, Wei-Chung, et al., Power-Optimal Encoding for DRAM Address Bus, ISLPED '00: Proceedings of the 2000 international symposium on Low power electronics and design, Aug. 2000, pp. 250-252.
Chou, Tan-Li, et al., Estimation of Circuit Activity Considering Signal Correlations and Simultaneous Switching, IEEE/ACM International Conference on Computer-Aided Design, Nov. 1994, pp. 300-303.
De Angel, Edwin, et al., Survey of Low Power Techniques for VLSI Design, Innovative Systems in Silicon Conference Session 6: Analog and Low Power Electronics, 1996, pp. 159-169.
Donaldson, Darrel D., et al., Snos 1K x 8 Static Nonvolatile RAM, IEEE Journal of Solid-State Circuits, vol. SC-17, No. 5, Oct. 1982, pp. 847-851.
Elliott, R.C., Managed Load Distribution, INTELEC '81—Third International Telecommunications Energy Conference, pp. 50-55.
Elpida, 128M bits Self Terminated Interface DDR SDRAM, Preliminary Datasheet Ver. 1.0, Jul. 2002.
Ewen, J. F., et al., CMOS circuits for GB/s serial data communication, IBM J. Res. Develop. vol. 39 No. 1/2 Jan./Mar. 1995, pp. 73-81.

Fagan, John L., et al., A 16-kbit Nonvolatile Charge Addressed Memory, IEEE Journal of Solid-State Circuits, vol. SC-11, No. 5, Oct. 1976, pp. 631-636.
Fornaciari, William, et al., Influence of Caching and Encoding on Power Dissipation of System-Level Buses for Embedded Systems, Design, Automation and Test in Europe Conference and Exhibition, 1999. Proceedings (Cat. No. PR00078), Mar. 1999, Munich, Germany.
GDDR4 Read and Write DBI, GDDR4 SGRAM Data Inversion.
Givargis, Tony D., et al., Interface and Cache Power Exploration for Core-Based Embedded System Design, 1999 IEEE/ACM International Conference on Computer-Aided Design. Digest of Technical Papers (Cat. No.99CH37051), Nov. 1999, pp. 270-273.
Green, J.H., et al., Line-Protection Switching, The Bell System Technical Journal, vol. 53, No. 10, Dec. 1974, USA, pp. 2011-2034.
Hakenes, Rolf, et al., A Segmented Gray Code for Low-Power Microcontroller Address Buses, Proceedings 25th EUROMICRO Conference. Informatics: Theory and Practice for the New Millennium, Sep. 1999, Milan, Italy.
Harboe-Sørensen, R., et al., Radiation Pre-screening of 4 Mbit Dynamic Random Access Memories for Space Application, RADECS 91 First European Conference on Radiation and its Effects on Devices and Systems, Sep. 1991, La Grande-Motte, France, pp. 489-504.
Harris, Erik P., et al., Technology Directions for Portable Computers, Proceedings of the IEEE, vol. 83, No. 4, Apr. 1995, pp. 636-658.
Hirsch, Donald J., Computer Communications Interface Devices for Tactical C3, MILCOM 1986—IEEE Military Communications Conference: Communications-Computers: Teamed for the 90's, Oct. 1986, pp. 5.4.1-5.4.5.
Hong, Sungpack, et al., Bus-Invert Coding for Low-Power IO—A Decomposition Approach, hoc. 43rd IEEE Midwest Symp. on Circuits and Systems, Lansing MI, Aug. 8-11, 2000, pp. 750-753.
Hossain, Rozak, et al., Low Power via Reduced Switching Activity and its Application to PLAs, pp. 100-103.
Hoyme, Kenneth, et al., SAFEbus, Proceedings IEEE/AIAA 11th Digital Avionics Systems Conference, Oct. 1992, Seattle, WA, USA, pp. 68-73.
Hsieh, Cheng-Ta, et al., Architectural Power Optimization by Bus Splitting, Proceedings Design, Automation and Test in Europe Conference and Exhibition 2000 (Cat. No. PR00537), Mar. 2000, Paris, France.
Iizuka, Tetsuya, Substrate-fed CMOS Memory Device, 1978 International Electron Devices Meeting, Dec. 1978, Washington, DC, USA, pp. 222-226.
Irwin, Mary Jane, et al., Energy Issues in Multimedia Systems, 1999 IEEE Workshop on Signal Processing Systems. SiPS 99. Design and Implementation (Cat. No.99TH8461), Oct. 1999, Taipei, Taiwan, pp. 24-33.
Kim, Kyeounsoo, et al., An Efficient Frame Memory Intci-face of MPEG-2 Vidco Encoder ASIC Chip, IEEE Transactions on Consumer Electronics, vol. 45, No. 3, Aug. 1999, pp. 507-514.
Kim, Sunghwan, et al., Low-power data representation, Electronics Letters May 25, 2000 vol. 36, No. 11, pp. 958-959.
Leung, Patrick S.-K., et al., Block-Inversion-Coded QAM Systems, IEEE Transactions On Communications, vol. 36, No. 7, Jul. 1988, pp. 797-805.
Lidgate, D., Electrical interlock design for complex high-power switching networks, Proc. IEE, vol. 126, No. 2, Feb. 1979, pp. 152-158.
Lin, Rung-Bin, et al., Theoretical Analysis of Bus-Invert Coding, Proc. 43rd IEFE Midwest Symp. on Circuits and Systems, Lansing MI, Aug. 8-11, 2000, pp. 742-745.
Macchiarulo, Luca, Low-Energy Encoding for Deep-Submicron Address Buses, ISLPED'01, Aug. 6-7, 2001, Huntington Beach, California, USA, pp. 176-181.
Mehta, Huzefa, et al., Some Issues in Gray Code Addressing, Proceedings of the Sixth Great Lakes Symposium on VLSI, Mar. 1996, Ames, IA, USA, pp. 178-181.
Moshnyaga, Vasily G., et al., Energy Saving Techniques for Architecture Design of Portable Embedded Devices, Proceedings. Tenth Annual IEEE International ASIC Conference and Exhibit (Cat. No.97TH8334), Sep. 1997, Portland, OR, USA, pp. 163-167.

(56) References Cited

OTHER PUBLICATIONS

Mudge, Trevor, Power: A First-Class Architectural Design Constraint, Computer, Apr. 2001, pp. 52-58.
Murgai, Rajeev, et al., Using Complement ion And Resequencing To Minimize Transitions, Proceedings 1998 Design and Automation Conference. 35th DAC. (Cat. No.98CH36175), Jun. 1998, San Francisco, CA, USA, pp. 694-697.
Musoll, Enric, et al., Exploiting the locality of memory references to reduce the address bus energy, Proceedings of 1997 International Symposium on Low Power Electronics and Design, Aug. 1997, Monteray, CA, USA, pp. 202-207.
Nakamura, Kazuyuki, et al., A 50 % Noise Reduction Interface Using Low- Weight Coding, 1996 Symposium on VLSI Circuits Digest of Technical Papers, Jun. 1996, Honolulu, HI, USA, pp. 144-145.
Noll, Tobias G., Low-Power Strategies for High-Performance CMOS Circuits, ESSCIRC '94: Twientieth European Solid-State Circuits Conference, Sep. 1994, Ulm, Germany, pp. 72-83.
Orton, James L. et al., An Improved Channel Coding Algorithm for Low-Frequency Spectral Suppression, IEEE Transactions On Communications, vol. 37, No. 10, Oct. 1989, pp. 1088-1091.
Panda, Preeti R., Reducing Address Bus Transit ions for Low Power Memory Mapping, Proceedings ED&TC European Design and Test Conference, Mar. 1996, Paris, France, pp. 63-67.
Panda, Preeti Ranjan, et al., Low-Power Memory Mapping Through Reducing Address Bus Activity, IEEE Transactions On Very Large Scale Integration (VLSI) Systems, vol. 7, No. 3, Sep. 1999, pp. 309-320.
Park, Arvin, et al., Codes to Reduce Switching Transients Across VLSI I/O Pins, Acm Sigarch Computer Architecture News, Sep. 1992, pp. 17-21.
Patra, P., et al., Power-efficient Delay-insensit Ive Codes for Data Transmission, Proceedings of the 28th Annual Hawall Intemational Conference on System Sciences—1995, pp. 316-323.
Pedram, Massoud, Power Optimization and Management in Embedded Systems, Proceedings of the ASP-DAC 2001. Asia and South Pacific Design Automation Conference 2001 (Cat. No.01EX455), Feb. 2001, Yokohama, Japan, pp. 239-244.
Raghunathan, Anand, et al., Controller re-specification to minimize switching activity in controller/data path circuits, ISLPED 1996 Monterey CA USA, 1996, pp. 301-304.
Ramprasad, Sumant, et al., Achievable Bounds On Signal Transition Activity, 1997 Proceedings of IEEE International Conference on Computer Aided Design (ICCAD), Nov. 1997, San Jose, CA, USA, pp. 126-129.
Ramprasad, Sumant, et al., Coding For Low-Power Address And Data Busses: A Source-Coding Framework and Applications, Proceedings Eleventh International Conference on VLSI Design, Jan. 1998, Chennai, India, pp. 18-23.
Roy, Kaushik, et al., Design of Low Power Digital Systems, Emerging Technologies: Designing Low Power Digital Systems, May 1996, pp. 137-204.
Sacha, John R., et al., No. Representations for Reducing Data Bus Power Dissipation, Conference Record of Thirty-Second Asilomar Conference on Signals, Systems and Computers (Cat. No.98CH36284), Nov. 1998, Pacific Grove, CA, USA, pp. 213-217.
Sasaki, Katsuro, et al., A 23-ns 4-Mb CMOS SRAM with 0.2-uA Standby Current, IEEE Journal of Solid-Tatecircuits, vol. 25, No. 5, Oct. 1990, pp. 1075-1081.
Sechler, R.F., et al., Design at the system level with VLSI CMOS, IBM J. Res. Develop. vol. 39 .No. 1/2 Jan./Mar. 1995, pp. 5-22.

Shin, Youngsoo, et al., Narrow Bus Encoding for Low Power Systems, Proceedings 2000. Design Automation Conference. (IEEE Cat. No.00CH37106), Jan. 2000, Yokohama, Japan, pp. 217-220.
Shin, Youngsoo, et al., Partial Bus-Invert Coding for Power Optimization of Application-Specific Systems, IEEE Transactions On Very Large Scale Integration (VLSI) Systems, vol. 9, No. 2, Apr. 2001, pp. 377-383.
Shin, Youngsoo, et al., Partial Bus-Invert Coding for Power Optimization of System Level Bus, Proceedings. 1998 International Symposium on Low Power Electronics and Design (IEEE Cat. No.98TH8379), Aug. 1998, Monterey CA, USA, pp. 127-129.
Shin, Youngsoo, et al., Reduction of bus transitions with partial bus-invert coding, Electronics Letters Apr. 2, 1998 vol. 34, No. 7, pp. 642-643.
Siegmund, Robert, et al., Adaptive Partial Businvert Encoding for Power Efficient Data Transfer over Wide System Buses, Proceedings 13th Symposium on Integrated Circuits and Systems Design (Cat. No.PR00843), Sep. 2000, Manaus, Brazil, pp. 371-376.
Sotiriadis, Paul P., et al., Bus Energy Minimization by Transition Pattern Coding (TPC) in Deep Sub-Micron Technologies, IEEE/ACM International Conference on Computer Aided Design. ICCAD—2000. IEEE/ACM Digest of Technical Papers (Cat. No.00CH37140), Nov. 2000, San Jose, CA, USA, pp. 322-327.
Sotiriadis, Paul P., et al., Transition Pattern Coding: An approach to reduce Energy in Interconnect, Proceedings of the 26th European Solid-State Circuits Conference, Sep. 2000, Stockholm, Sweden.
Stan, Mircea R., et al., Bus-Invert Coding for Low-Power I/O, IEEE Transactions On Very Large Scale Integration (VLSI) Systems, vol. 3, No. I , Mar. 1995, pp. 49-58.
Stan, Mircea R., et al., Two-Dimensional Codes for Low Power, ISLPED 1996 Monterey CA USA, pp. 335-340.
Stan, Mircea R., Low-Power Encodings for Global Communication in CMOS VLSI, IEEE Transactions On Very Large Scale Integration (VLSI) Systems, vol. 5, No. 4, Dec. 1997, pp. 444-455.
Su, Ching-Long, et al., Cache Designs for Energy Efficiency, Proceedings of the 28th Annual Hawaii International Conference on System Sciences—1995, pp. 306-315.
Su, Ching-Long, et al., Saving Power in the Control Path of Embedded Processors, IEEE Design & Test of Computers—Embedded Processors, Winter 1994, pp. 24-30.
Sundararajan, Vijay, et al., Data Transmission Over a bus with Peak-Limited Transition Activity, Proceedings 2000. Design Automation Conference. (IEEE Cat. No.00CH37106), Jan. 2000, Yokohama, Japan, pp. 221-224.
Tabor, Jeff F., Noise Reduction Using Low Weight and Constant Weight Coding Techniques, MIT Artificial Intelligence Laboratory Technical Report 1232, May 11, 1990.
Torku, Kofi E., et al., Noise Problems in Testing VLSI Hardware, IEEE Design & Test of Computers, Dec. 1985, pp. 36-43.
Yang, Jun, et al., FV Encoding for Low-Power Data I/O, ISLPED'01, Aug. 6-7, 2001, Huntington Beach, Califomia, USA, pp. 84-87.
Yang, Jun, et al., FV Encoding for Low-Power Data I/O, ISLPED'01: Proceedings of the 2001 International Symposium on Low Power Electronics and Design (IEEE Cat. No.01TH8581), Aug. 2001, Huntington Beach, CA, USA, pp. 84-87.
10 2019 107 849.0_DPMA_Office Action dated Aug. 11, 2021.
10 2019 108 205.6 DPMA Office Action dated Aug. 10, 2021.
NPL_Khandelwal_etal_DesignCon.
1133612019.8_Official Communication Chinese Patent Office 20230608 all pages.
201910242543.7_Official Communication Chinese Patent Office 20230608 all pages.
NPL_10 2019 107 670.6_Office Action German Patent Office.

* cited by examiner

| bits to encode | Bridging 4-level symbols (L: 0X, H: 1X) | | | |
|---|---|---|---|---|
| | L↔L | H↔H | L↔H | H↔L |
| 000 | 00 01 | 01 11 | 00 01 | 01 00 |
| 001 | 01 00 | 11 01 | 01 11 | 11 01 |
| 010 | 00 10 | 11 10 | 00 10 | 11 10 |
| 011 | 10 00 | 10 11 | 10 11 | 10 00 |
| 100 | 01 01 | 01 01 | 01 01 | 01 01 |
| 101 | 01 10 | 01 10 | 01 10 | 01 10 |
| 110 | 10 01 | 10 01 | 10 01 | 10 01 |
| 111 | 10 10 | 10 10 | 10 10 | 10 10 |

FIG. 4

REDUCING COUPLING AND POWER NOISE ON PAM-4 I/O INTERFACE

BACKGROUND

Modern high throughput systems utilize multiple high bandwidth input/output interfaces to form a signaling network between compute units, memory devices, and storage devices. For example, Peripheral Component Interconnect Express (PCI-E) connects multiple periphery devices to central processing units (CPUs) and graphics processing units (GPUs). These interfaces may comprise multiple serial data buses that operate at high frequency.

Pulse amplitude modulation (PAM) may be utilized on a multi-lane serial data bus to transfer multiple bits of data simultaneously by encoding the data as different voltage levels. Here, "lane" refers to a single wire of a serial data bus. A "data burst" refers to bits placed on the data lanes of a serial data bus in a same bus clock interval, i.e., in parallel.

An example of PAM communication is PAM-4. During each bus clock interval, PAM-4 encodes two bits of data (00, 01, 10, 11) on each data lane of a serial data bus as one of four different voltage levels (symbols). Because two bits are encoded into each bus clock interval on each data lane, PAM-4 ideally enables twice the bandwidth compared to conventional two-level (e.g., PAM-2) signaling on serial data buses operating at comparable bus clock frequencies. PAM-4 symbols utilize four different voltage levels and therefore there is less voltage-level distinction between symbol values in PAM-4 compared to PAM-2. This makes PAM-4 communications more vulnerable to interference effects such as coupling noise between data lanes on a serial data bus, and power supply noise, which reduces the signal to noise ratio (SNR).

One mechanism to mitigate these noise effects is to utilize Data Bus Inversion (DBI). For a given data burst, DBI reduces the total extent of voltage level transitions across the data lanes of a serial data bus by up to half by intelligently setting the polarity of the bits in each data burst on the serial data bus. DBI requires an additional metadata bit per data burst to transfer the data burst polarity setting (non-inverted data burst, or inverted data burst) to the receiver. This metadata bit is often transmitted on an extra wire that is separate from the data lanes (each also one wire, typically) of the serial data bus.

Many serial data buses comprise only a single data lane between the transmitter and the receiver. Adding an additional metadata wire can thus result in up to 100% overhead in the number of wires required for the serial data bus.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 illustrates a PAM-433 encoder 400 in accordance with one embodiment.

DETAILED DESCRIPTION

Figure 1:
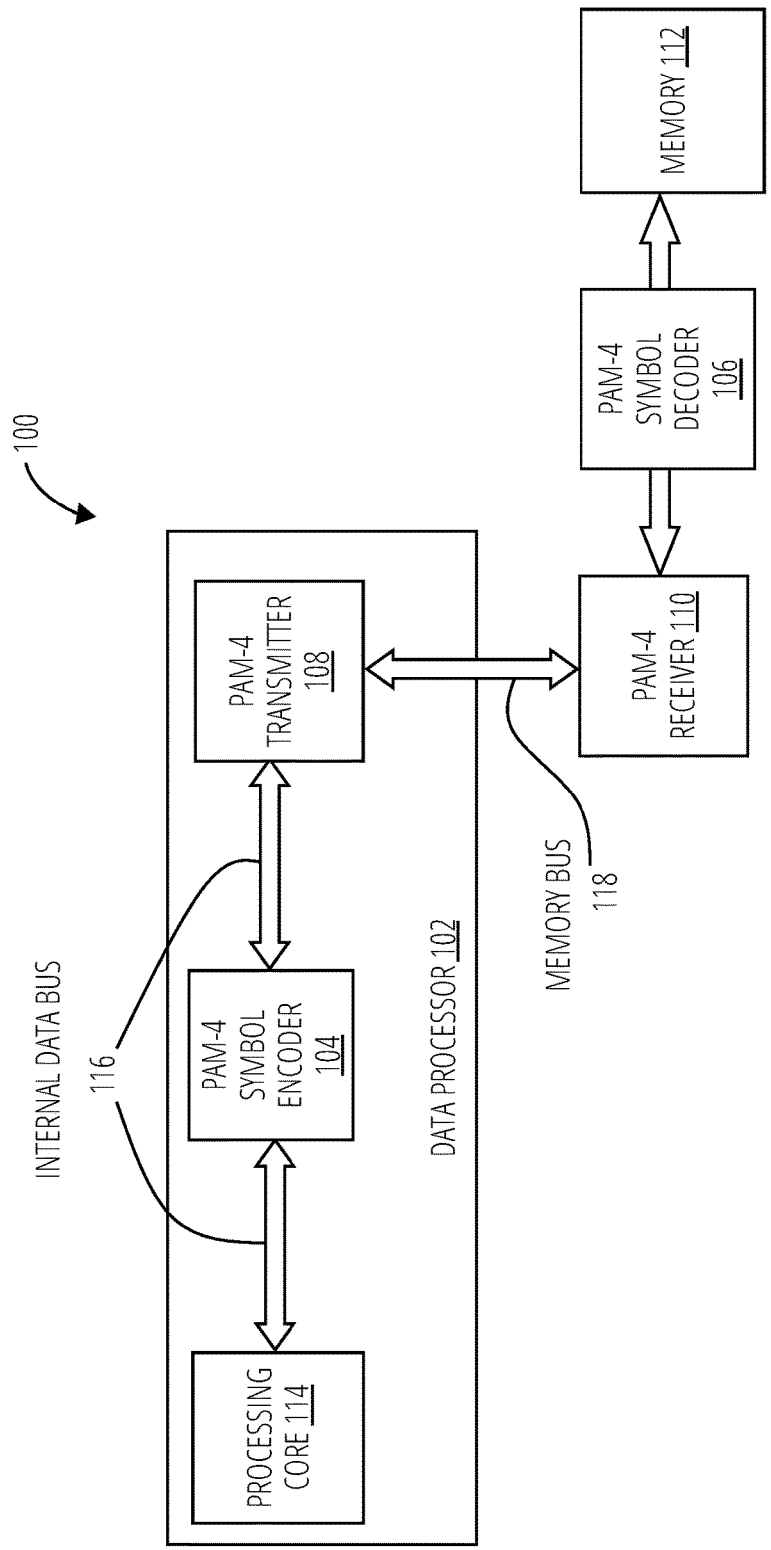
FIG. 1 illustrates a data communication system 100 in accordance with one embodiment.

Referring to FIG. 1, a data communication system 100 comprises a transmitting device such as a data processor 102 that includes a processing core 114, PAM-4 symbol encoder 104, and a PAM-4 transmitter 108. The data processor 102 may in some embodiments comprise a graphics processing unit (GPU), a central processing unit (CPU), a system on a chip (SoC), or other well-known data processing devices.

The data processor 102 communicates with a receiving device such as a memory 112 over a bus such as a memory bus 118. A PAM-4 receiver 110 and PAM-4 symbol decoder 106 receive and process PAM-4 signals communicated from the data processor 102 to the memory 112 over the memory bus 118.

The data processor 102 utilizes an internal data bus 116 to transmit data bursts to and from the processing core 114 over a multi-lane internal data bus 116. The PAM-4 symbol encoder 104 receives a burst of data to encode from the processing core 114 and performs PAM-4 encoding on that burst. The PAM-4 transmitter 108 transmits the encoded burst to the PAM-4 receiver 110 via the memory bus 118. The PAM-4 receiver 110 receives the encoded burst and sends the encoded burst to the PAM-4 symbol decoder 106 to decode the burst. Once decoded, the burst is sent to the memory 112.

This is a simplified diagram. In practice, there would typically be encoders and decoders on both ends of the memory bus 118 for both writing to and reading from the memory 112.

Figure 2:
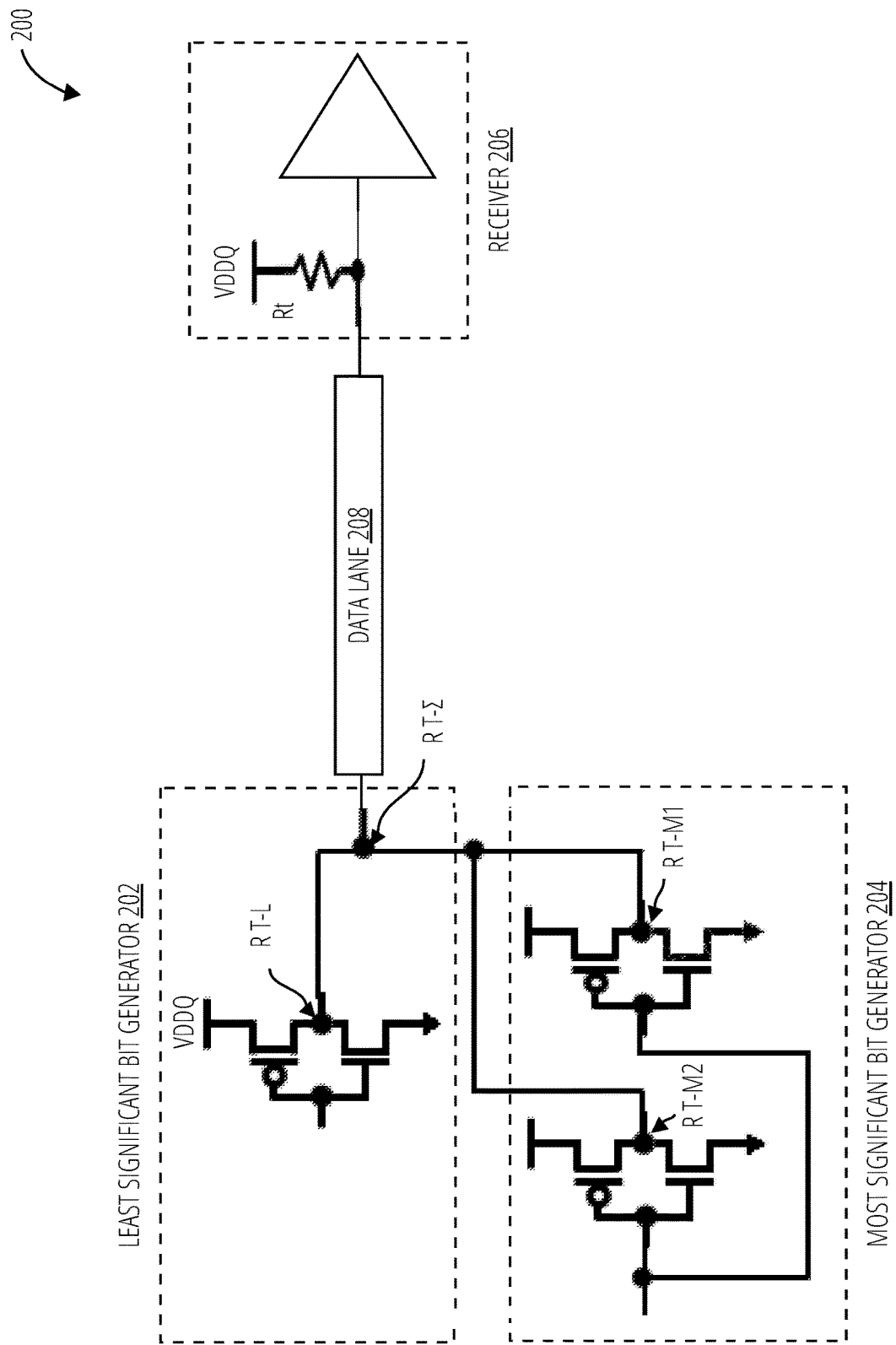
FIG. 2 illustrates an embodiment of a PAM-4 transceiver 200.

FIG. 2 illustrates a PAM-4 transceiver 200 for a single data lane of a serial data bus in one embodiment. The PAM-4 transceiver 200 comprises a least significant bit transmitter 202, a most significant bit transmitter 204, a receiver 206, and a data lane 208. The PAM-4 transceiver 200 utilizes the least significant bit transmitter 202 and the most significant bit transmitter 204 to generate a four-level symbol on the data lane 208. Herein the term "symbol" refers to a voltage level generated by a line driver on a serial data bus data lane, where the voltage level represents the value of one or more bits of data. Thus "encoding a symbol" means physically configuring a line driver circuit of the serial data bus to drive the voltage on the data lane to a particular value.

For example, if the two-bits of data to encode into the symbol are (1,1), the outputs of the least significant bit transmitter 202 and most significant bit transmitter 204 combine to generate a voltage of, e.g., 1.2 V on the data lane 208 and current on the data lane 208 is, e.g., 0 mA due to the pull-up transistor Rt at the receiver 206 (both ends of the data lane 208 are at the same potential). If the two-bits of data to encode into the symbol are (1,0), the outputs of the least significant bit transmitter 202 and most significant bit transmitter 204 combine to generate a voltage of, e.g., 1.0 V on the data lane 208 and current on the data lane 208 is, e.g., 5 mA. If the two-bits of data to encode into the symbol are (0,1), the outputs of the least significant bit transmitter 202 and most significant bit transmitter 204 combine to generate a voltage of, e.g., 0.8 V on the data lane 208 and current on the data lane 208 is, e.g., 10 mA. If the two-bits of data to encode into the symbol are (0,0), the outputs of the least significant bit transmitter 202 and most significant bit transmitter 204 combine to generate a voltage of, e.g., 0.6 V on the data lane 208 and current on the data lane 208 is, e.g., 15 mA. The 0.6V may be referred to herein as the base transmission voltage $V_b$ from which the other symbol voltage levels are delta-ed.

The symbol value on a data lane therefore corresponds to the current consumption of that data lane during a data burst. Weights may therefore be assigned to the symbol values reflecting their current consumption cost. For example, a weight of 0 may be assigned to the symbol for the bit pair (1,1); a weight of 1 may be assigned for the symbol for the bit pair (1,0); a weight of 2 may be assigned to the symbol for the bit pair (0,1); and a weight of 3 may be assigned for the symbol for the bit pair (0,0).

In this example, a data burst on an eight lane serial data bus utilizing PAM-4 encoding may be assigned a total weight that ranges from 0 to 24, which equates to a current consumption range of, e.g., 0 to 120 mA. The total weight for the data burst would be 0 if all the symbols in the data burst each encoded the bit pair (1,1), and the total weight for the data burst would be 24 if all the symbols in the data burst each encoded the bit pair (0,0). Data bursts comprising all 0's consume the most current, hence are the most expensive from a power consumption standpoint.

Figure 3:
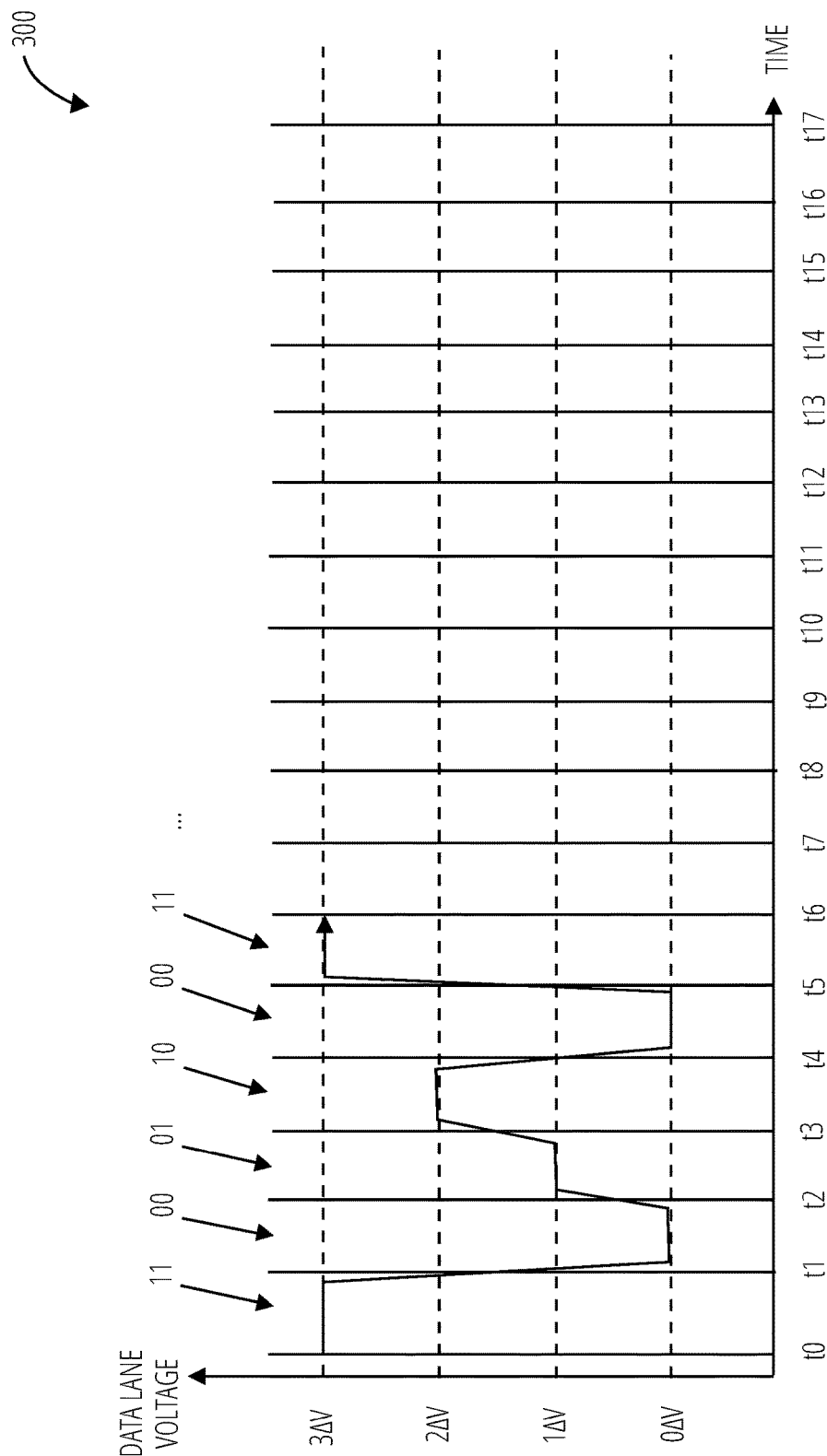
FIG. 3 illustrates an embodiment of a conventional PAM-4 data lane voltage waveform 300.

Referring to FIG. 3, a conventional PAM-4 data lane voltage waveform 300 encodes two bits of data on the data lane per clock interval by utilizing all 4-level symbols. An exemplary sequence of 12 bits is 110001100011. This sequence may be transferred as a series of four-level symbols each encoding two bits. For the bit sequence 110001100011, the bits 11 are encoded into the first serial data bus clock interval t0-t1; the next two bits 00 are encoded into the second serial data bus clock interval t1-t2; and so on. This results in two 3ΔV voltage level changes on the serial data bus from t0-t1 and from t4-t5.

The notation nΔV refers to a voltage change of n-deltas from the base voltage $V_b$ on a data lane of a serial data bus between clock intervals. For example, referring back to FIG. 2 in which different symbols have a 0.2V separation and the base voltage $V_b$ is 0.6V, a 3ΔV change would correspond to 3×0.2V or a 0.6V delta in voltage on the data lane between bus clock cycles.

Higher voltage deltas generate more noise because they lead to higher current swings in the data lane. Thus in FIG. 3 the 3ΔV deltas between bus clock intervals t0 and t1, and again between t4 and t5, may generate significant noise. Mitigating this maximum delta voltage activity helps to improve the SNR of a PAM-4 system such as the PAM-4 transceiver 200.

Figure 5:
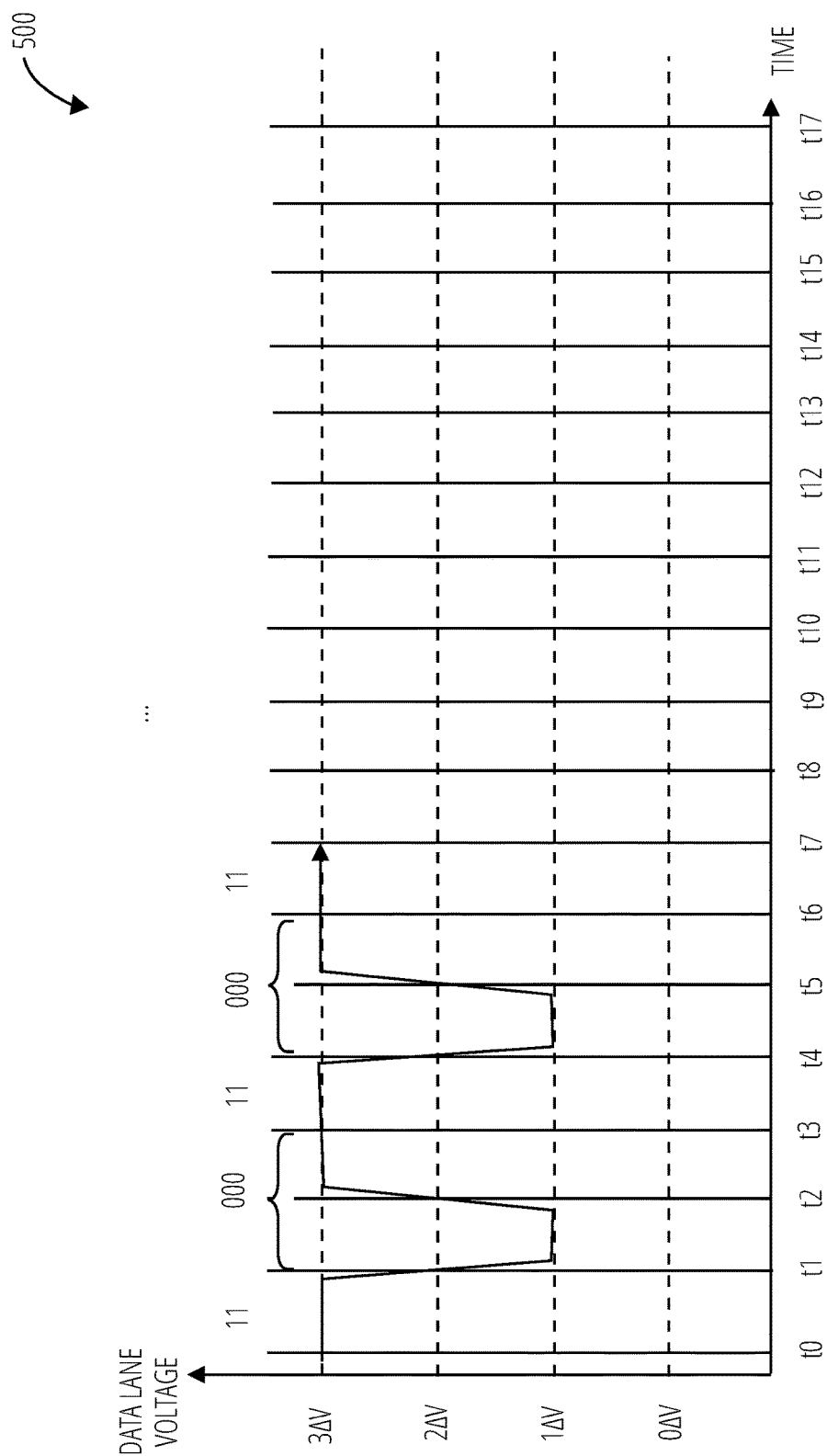
FIG. 5 illustrates an embodiment of a PAM-433 data lane voltage waveform 500.

A logic table for a PAM-433 encoder 400 in one embodiment is illustrated in FIG. 4. The PAM-433 encoder 400 eliminates 3ΔV voltage level changes on the serial data bus for the exemplary bit sequence 110001100011 discussed above. As shown in the logic table, when the 3-bit sequence 000 comes between two 2-bit sequences of the form 1x (where x is a "don't care" value of either 0 or 1), the 3-bit sequence 000 is encoded as the four bits 0111 (see first row of the logic table, third column). In other words, when the 3-bit sequence 000 bridges two 2-bit sequences that each have the most significant bit set (1x), the seven total bits are re-encoded as 1x01111x. In the example above where the seven total bits are 1100011, the re-encoded sequence is 11011111. Each 2-bit pair of this sequence is then transmitted as a PAM-4 symbol on the data lane of the serial data bus, resulting in the PAM-433 data lane voltage waveform 500 of FIG. 5. The 3ΔV voltage level changes in the sequence 110001100011 have been eliminated with use of a DBI line at the cost of one serial data bus clock cycle. In other words, the effective data transfer rate is reduced by 16.7% to 1.67 bits serial data bus clock interval on average assuming a randomly distributed bit sequence, compared to 2.0 bits per serial data bus clock interval for conventional PAM-4

The PAM-433 encoder 400 results in a 33% reduction in the worst case voltage level switching on the data line over conventional PAM-4 encoders without necessitating the transmission of any metadata. The PAM-433 encoder 400 divides a sequence of bits to be transmitted on the data lane into sequences of five bits of data: the first two bits of each five bits are encoded into a symbol with four possible voltage levels and the last three bits of the five bits are encoded into two symbols each with three possible voltage levels.

In general, the above mechanisms may be applied to PAM-N (symbols utilizing N possible discrete voltage levels). For example, a PAM-866 scheme may transfer a 3-bit data symbol at the first transfer and a 5-bit data symbol over the following two transfers (2.67 bits-per-transfer, 11.1% overhead). PAM-866 may reduce the maximum voltage switching from 7ΔV (PAM-8) to 5ΔV (a 28.5% reduction). Furthermore, the mechanisms may be extended to other arbitrary combinations of data symbols (e.g., PAM-WXYZ) to achieve better reliability by leveraging similar mechanisms as PAM-433.

FIG. 6 to FIG. 9 depict various data lane voltage waveforms when PAM-433 encoding is utilized. Four data lane voltage waveforms are depicted for various different bit patterns to transmit on the data lane: data lane voltage waveforms 600, data lane voltage waveforms 700, data lane voltage waveforms 800, and data lane voltage waveforms 900.

Figure 6:
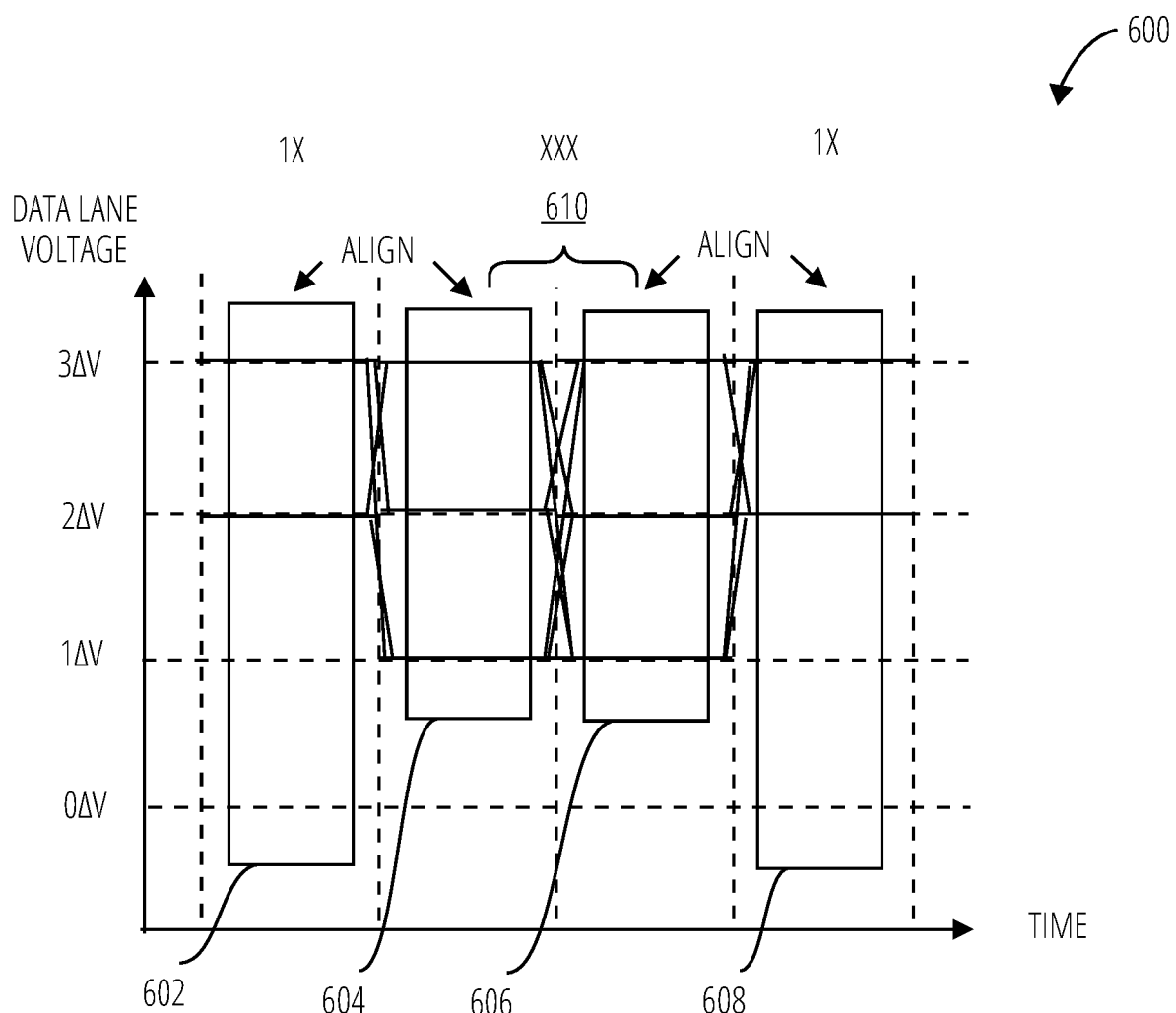
FIG. 6 illustrates an embodiment of a data lane voltage waveforms 600.
Figure 7:
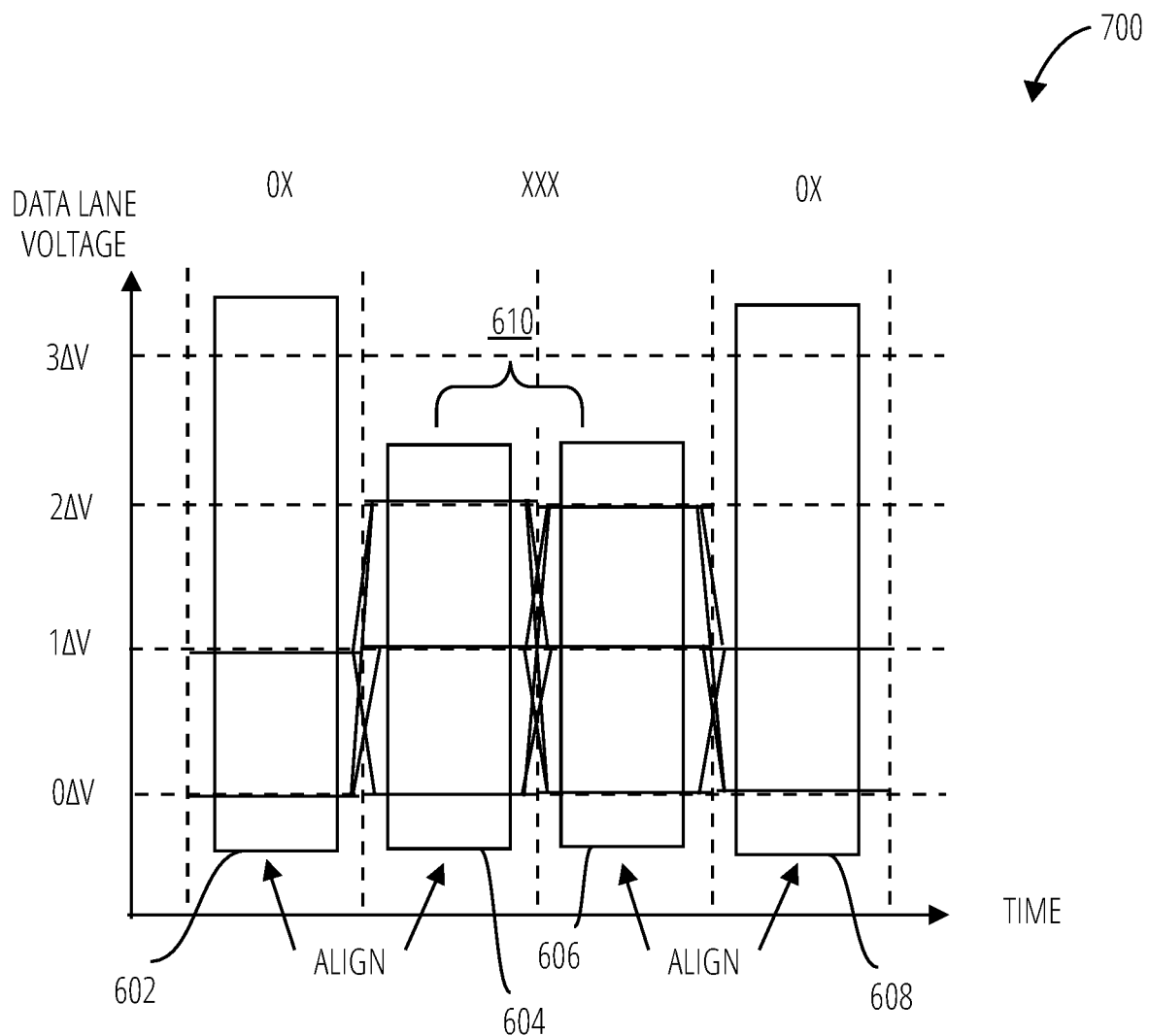
FIG. 7 illustrates an embodiment of a data lane voltage waveforms 700.

For the data lane waveforms depicted in FIG. 6 and FIG. 7, a first three-level symbol 604 and a second three-level symbol 606 are utilized as a "bridge 610" between a first four-level symbol 602 and a second four-level symbol 608 that have the same most significant bit (MSB). Examples that fit this pattern are pairs of four-level symbols such as: 11 (3ΔV)/10 (2ΔV) (FIG. 6) and 01 (1ΔV)/00 (0ΔV) (FIG. 7). The PAM-433 encoding aligns the voltage windows of the first three-level symbol 604 and the second three-level symbol 606 to the voltage level of the first four-level symbol 602 and the first three-level symbol 604 in such a way that the maximum voltage delta in the data lane voltage waveform is 2ΔV.

Figure 8:
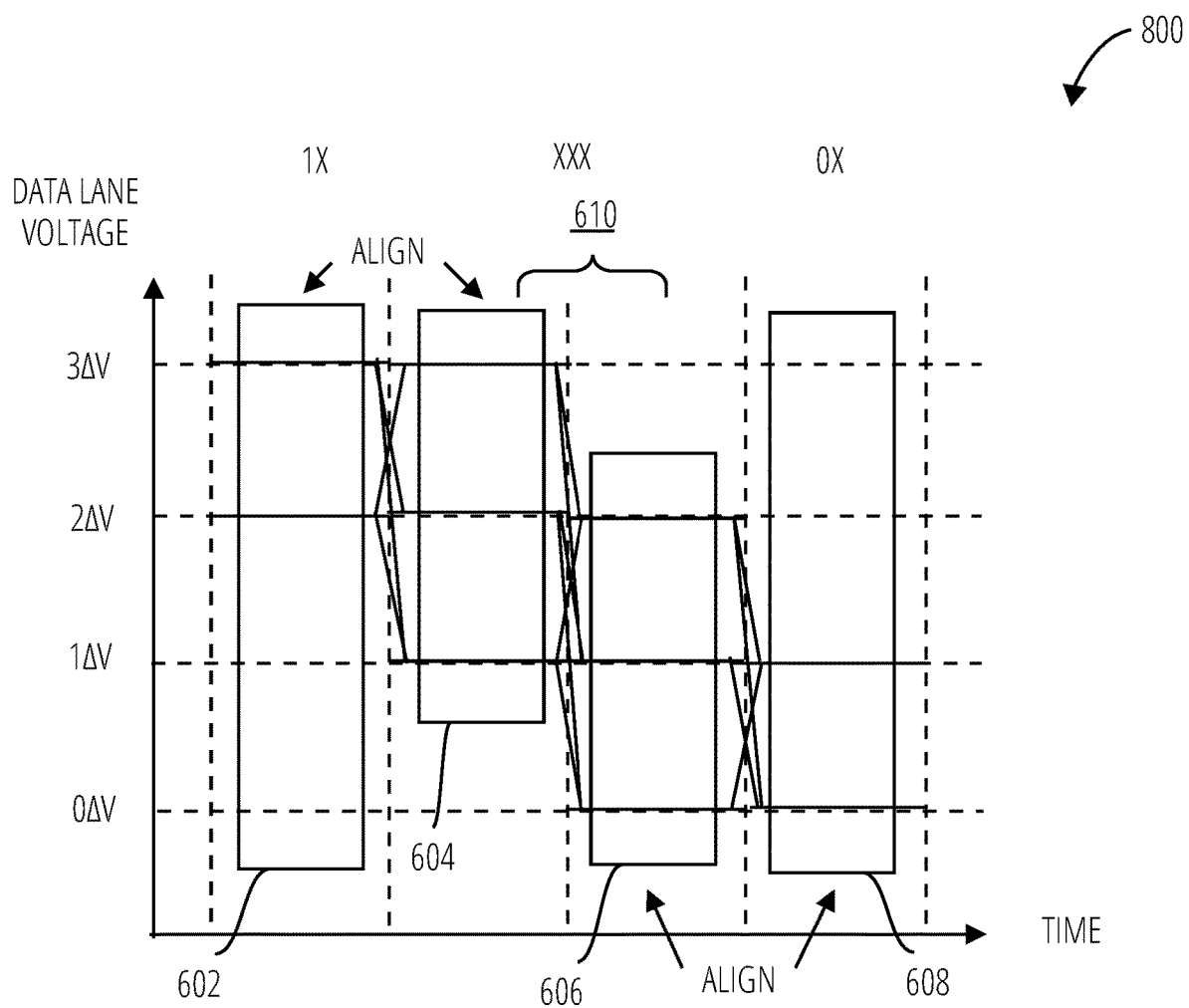
FIG. 8 illustrates an embodiment of a data lane voltage waveforms 800.
Figure 9:
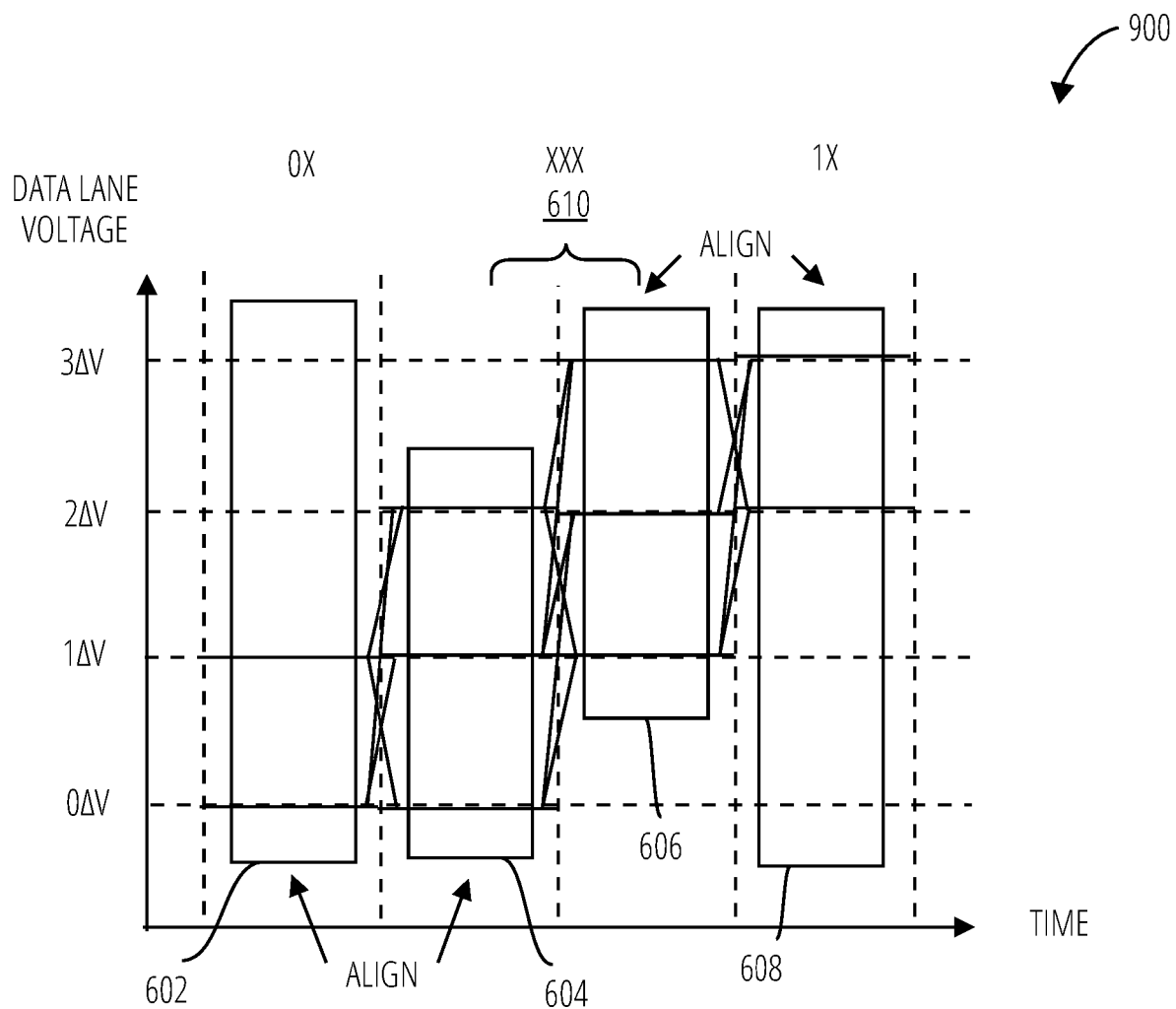
FIG. 9 illustrates an embodiment of a data lane voltage waveforms 900.

For the data lane waveforms depicted in FIG. 8 and FIG. 9, the first three-level symbol 604 and the second three-level symbol 606 are utilized as the bridge 610 between a first four-level symbol 602 and a second four-level symbol 608 that have different MSBs. A 3ΔV voltage delta is possible in this scenario between the first three-level symbol 604 and the second three-level symbol 606. However, the PAM-433 encoder 400 does not map the values that would cause this to happen in the logic table. The symbol that would cause a 3ΔV voltage delta between the three-level bursts is never used by the PAM-433 encoder 400, thus maintaining the maximum voltage delta in the data lane waveform at 2ΔV.

Figure 10:
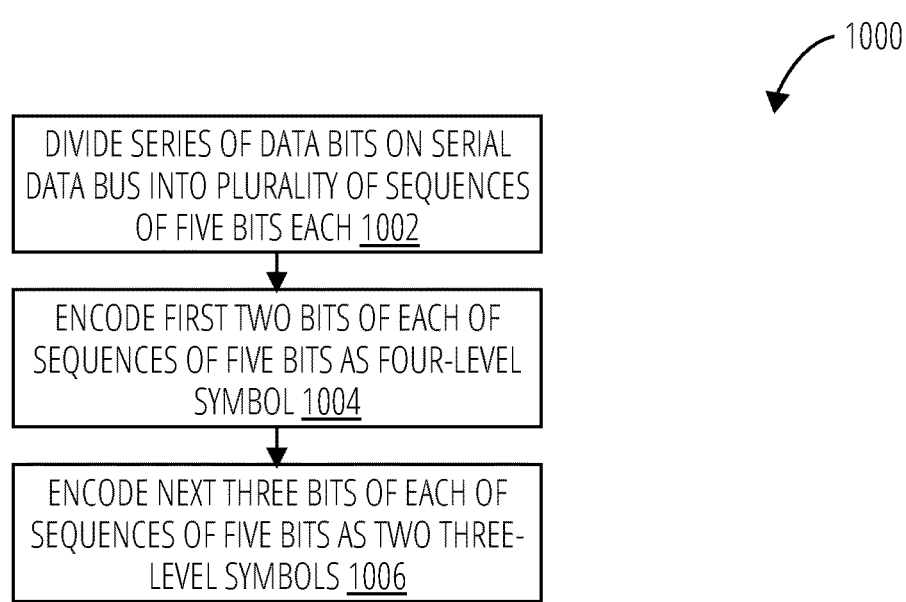
FIG. 10 illustrates an embodiment of a PAM-433 routine 1000.

Referring to FIG. 10, the PAM-433 routine 1000 in one embodiment divides a series of data bits on the serial data bus into a plurality of sequences of five bits each (block 1002). Next, the PAM-433 routine 1000 encodes a first two bits of each of the sequences of five bits as a four-level symbol (block 1004). Then, the PAM-433 routine 1000 encodes a next three bits of each of the sequences of five bits as two three-level symbols (block 1006). The PAM-433 routine 1000 may operate to encode symbols on one or more data lanes of a serial data bus.

In some embodiments, the two three-level symbols comprise a first three-level symbol and a second three-level symbol. The PAM-433 routine 1000 operates a serial data bus to encode a voltage level of the first three-level symbol as either (a) at most two voltage steps below a voltage level of the four-level symbol, or (b) at most two voltage steps above the voltage level of the four-level symbol. The sequences of five bits may also comprise a first sequence of five bits transmitted on the serial data bus, and a second sequence of five bits transmitted after the first sequence of five bits on the serial data bus. The PAM-433 routine 1000 may then operate the serial data bus to encode a voltage level of the second three-level symbol of the first sequence of five bits as either (a) at most two voltage steps below a voltage level of the four-level symbol of the second sequence of five bits, or (b) at most two voltage steps above the voltage level of the four-level symbol of the second sequence of five bits.

Figure 11:
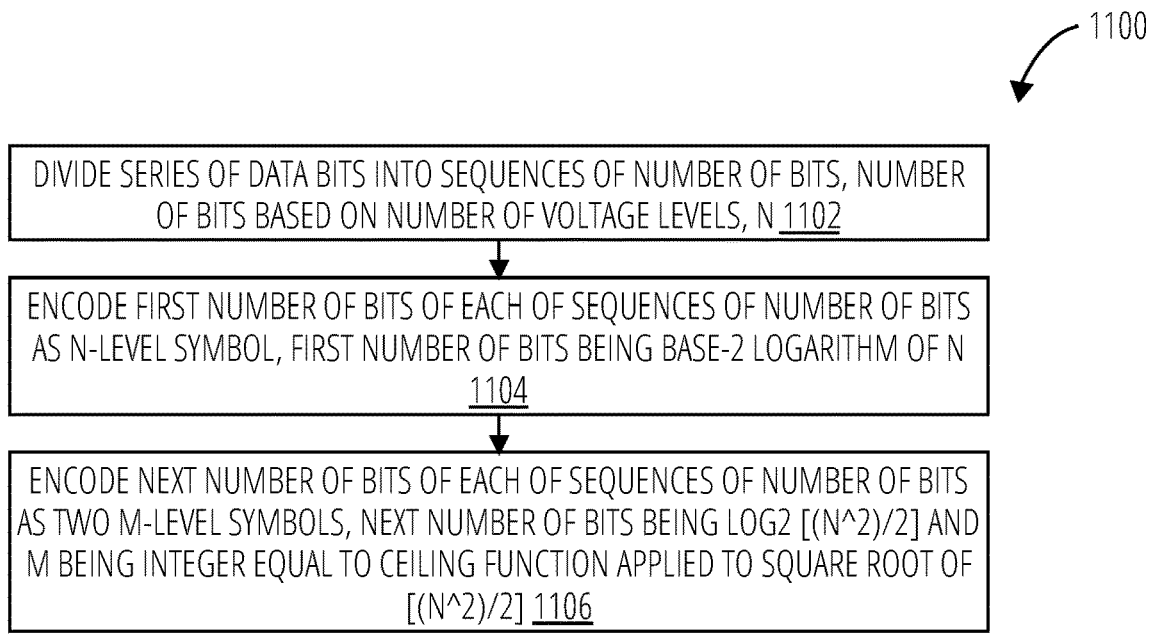
FIG. 11 illustrates an embodiment of a PAM-N routine 1100.

Referring to FIG. 11, a more general PAM-N routine 1100 divides the series of data bits into sequences of a number of bits, the number of bits based on a number of voltage levels, N (block 1102). Next, the PAM-N routine 1100 encodes a first number of bits of each of the sequences of a number of bits as an N-level burst, the first number of bits being the base-2 logarithm of N (block 1104). Then, the PAM-N routine 1100 encodes a next number of bits of each of the sequences of a number of bits as two M-level bursts, the next number of bits being log 2 [(N^2)/2] and M being an integer equal to a ceiling function applied to a square root of [(N^2)/2] (block 1106). The PAM-N routine 1100 may operate to communicate data over a serial data bus.

Figure 12:
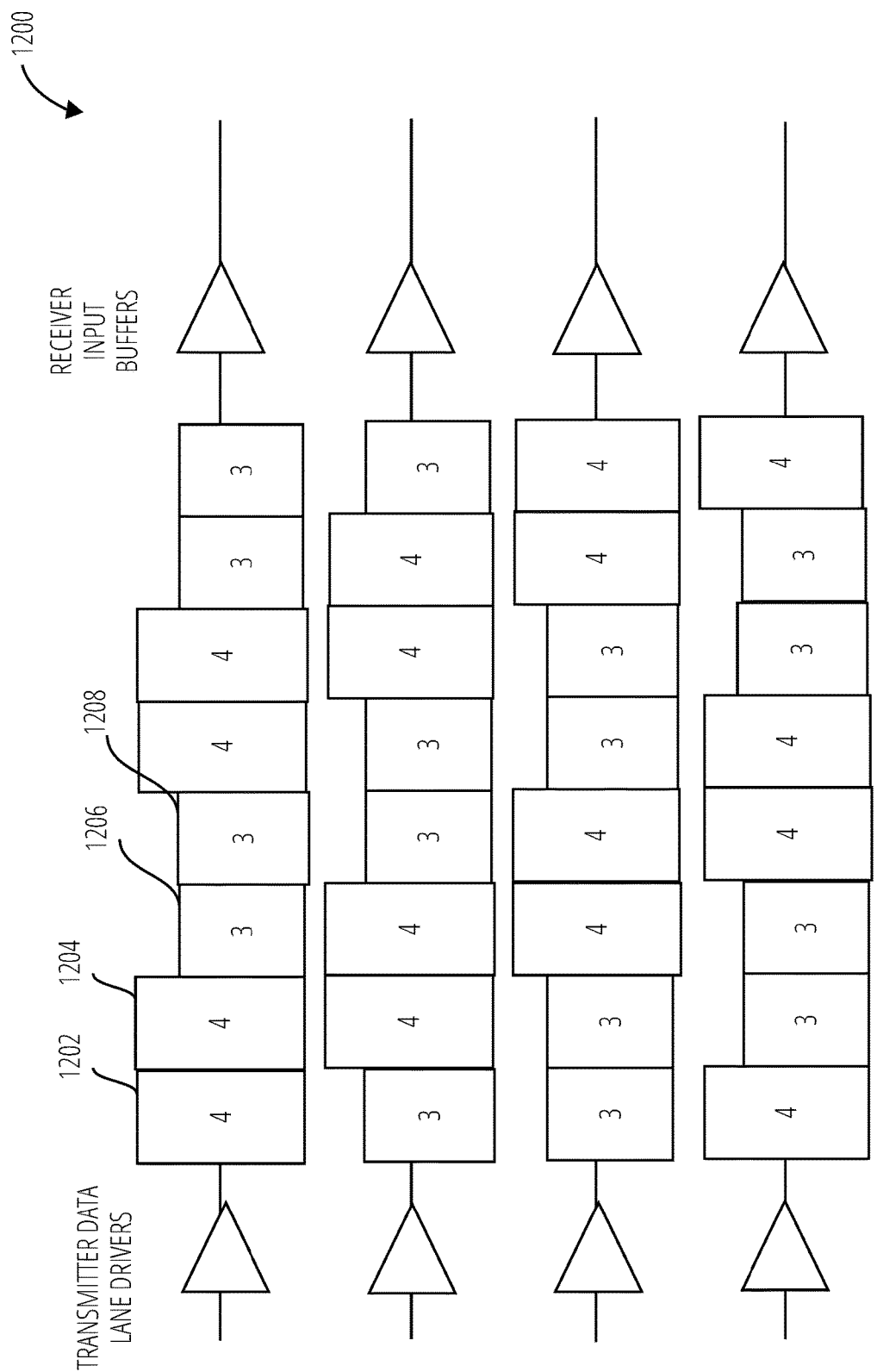
FIG. 12 illustrates an embodiment of a PAM-4433 encoding 1200.

Referring to FIG. 12, a PAM-4433 encoding 1200 embodiment is illustrated. The PAM-4433 encoding 1200 operates a serial data bus to encode and transfer a 7-bit data word using a sequence of a first four-level symbol 1202, a second four-level symbol 1204, a first three-level symbol 1206, and a second three-level symbol 1208. As a result, it is possible for 3ΔV voltage delta to occur on a particular data lane between two four-level symbols, such as the first four-level symbol 1202 and the second four-level symbol 1204. However, as FIG. 12 depicts, the potential 3ΔV voltage deltas may be staggered across multiple data lanes, reducing the maximum voltage delta in any particular data burst (all bits sent over the serial data bus during one clock interval). Multiple 3ΔV voltage deltas do not occur in the same data burst, reducing crosstalk and other noise sources. This PAM-4433 encoding 1200 has a 12.5% bandwidth cost (1.75 bits-per-transfer) while having a maximum average 2.25ΔV maximum voltage delta over the four data lanes in this example (other numbers of data lanes may of course be used in other embodiments).

Figure 13:
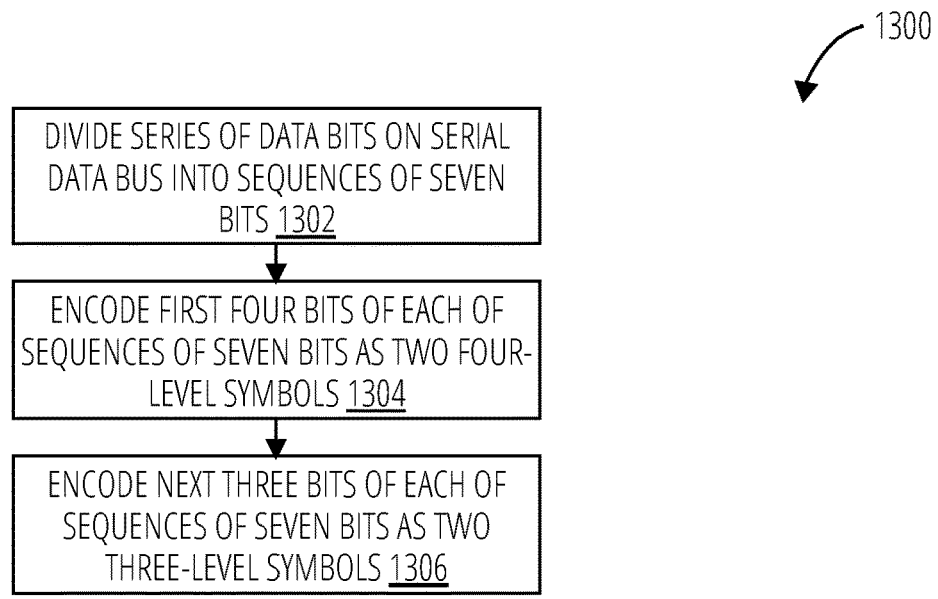
FIG. 13 illustrates an embodiment of a PAM-4433 routine 1300.

Referring to FIG. 13, an embodiment of a PAM-4433 routine 1300 divides a series of data bits to be transmitted on the data lane of a serial data bus into sequences of seven bits (block 1302). Next, the PAM-4433 routine 1300 encodes a first four bits of each of the sequences of seven bits as two four-level symbols (block 1304). Then, the PAM-4433 routine 1300 encodes a next three bits of each of the sequences of seven bits as two three-level symbols (block 1306). This is repeated for across multiple data lanes of a serial data bus and the transitions between four-level symbols may then be staggered in time (aligned on different serial data bus clock intervals) across the data lanes.

Figure 14:
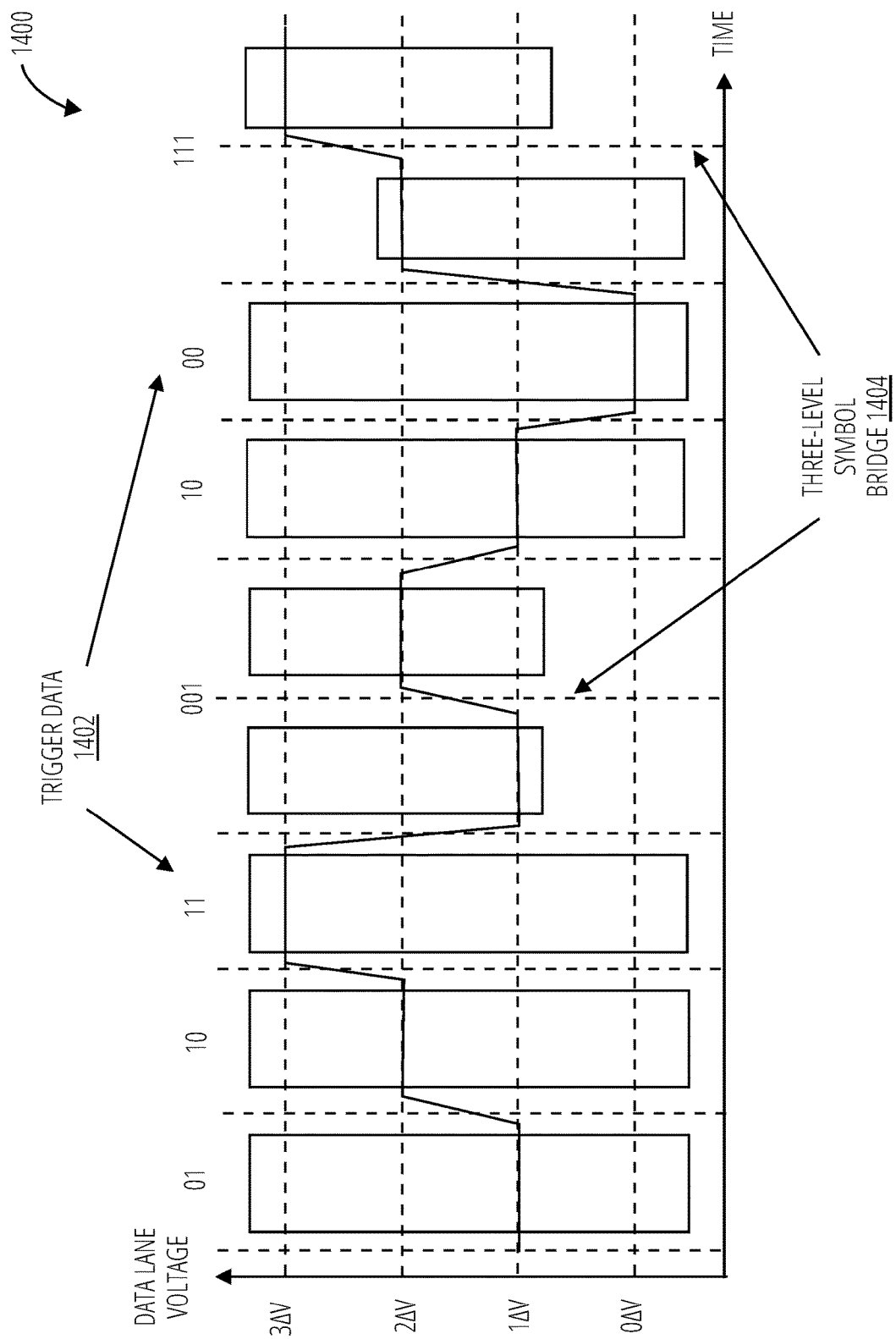
FIG. 14 illustrates an embodiment of a variable PAM-433 encoding 1400.

Referring to FIG. 14, a variable PAM-433 encoding 1400 in one embodiment activates PAM-433 encoding if the current symbol corresponds to a data lane voltage of either 0ΔV or 3ΔV. This is referred to as "trigger data 1402" to activate PAM-433 encoding. Upon encountering the trigger data 1402, an appropriate three-level symbol bridge 1404 is utilized after the trigger data. Otherwise if the trigger data is not encountered, the variable PAM-433 encoding 1400 utilizes conventional PAM-4 encoding (all symbols are four-level). The variable PAM-433 encoding 1400 results in a maximum voltage delta of 2ΔV in the serial data bus data lane voltage waveform.

Figure 15:
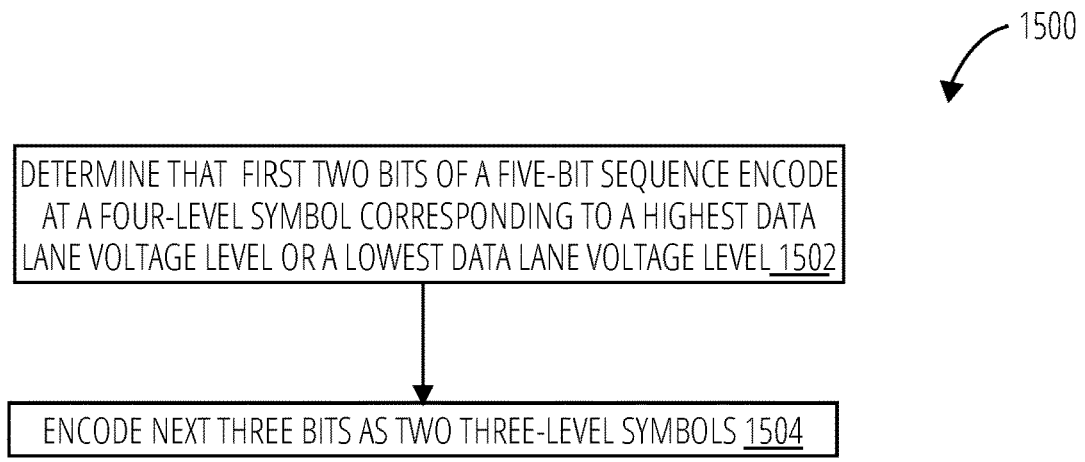
FIG. 15 illustrates an embodiment of a variable PAM-433 routine 1500.

Referring to FIG. 15, a variable PAM-433 routine 1500 determines that a first two bits of sequences of five bits encode to a four-level symbol corresponding to a highest voltage level or a lowest voltage level utilized on a data lane of a serial data bus (block 1502). In other words, the trigger data is encountered. In response to encountering the trigger data, the variable PAM-433 routine 1500 encodes a next three bits of the sequences of five bits as two three-level symbols (block 1504).

Figure 16:
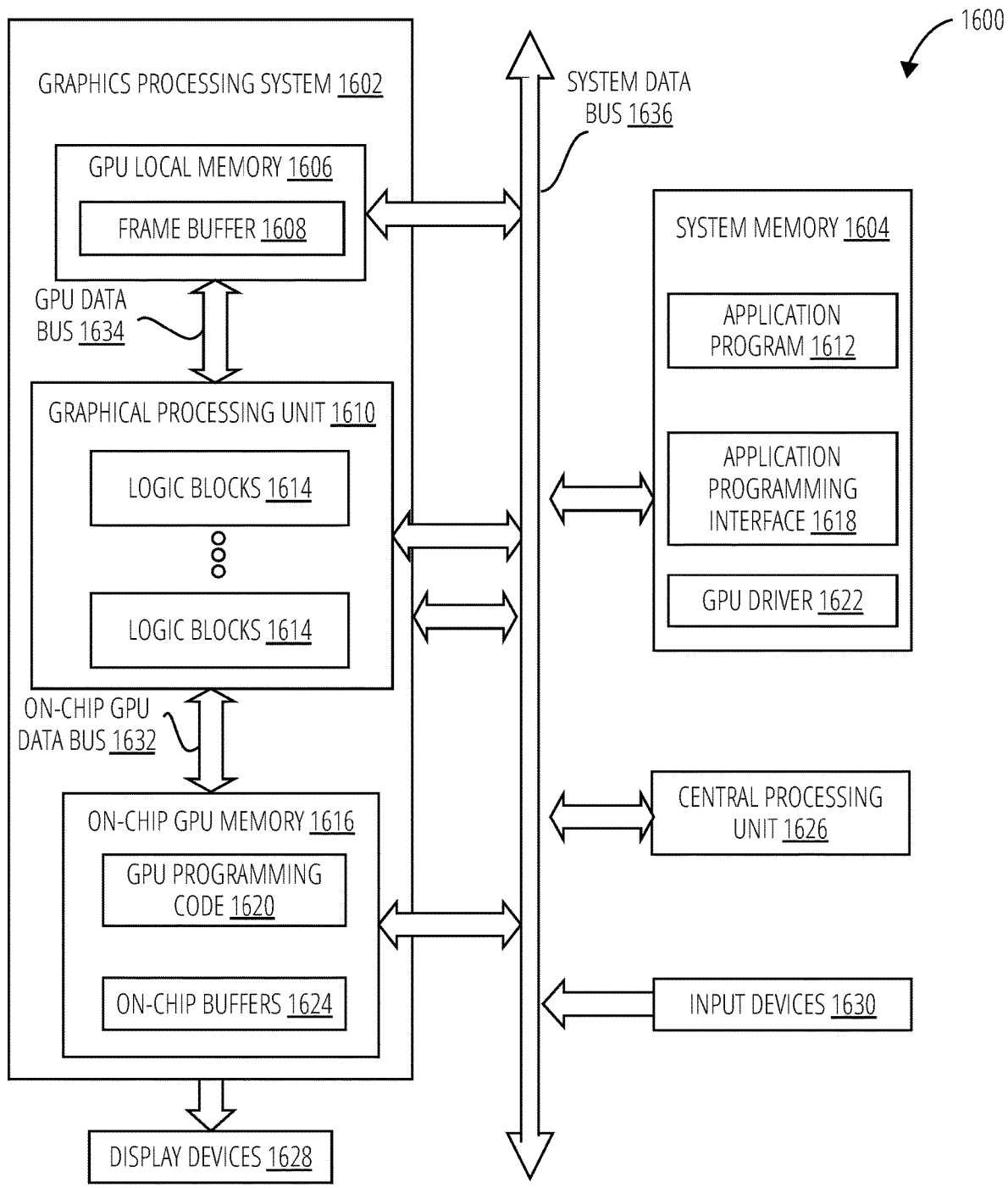
FIG. 16 is a block diagram of a computing system 1600 including a GPU in which aspects of the invention may be embodied or carried out.

FIG. 16 is a block diagram of one embodiment of a computing system 1600 in which one or more aspects of the invention may be implemented. The computing system 1600 includes a system data bus 1636, a CPU 1626, input devices 1630, a system memory 1604, a graphics processing system 1602, and display devices 1628. In alternate embodiments, the CPU 1626, portions of the graphics processing system 1602, the system data bus 1636, or any combination thereof, may be integrated into a single processing unit. Further, the functionality of the graphics processing system 1602 may be included in a chipset or in some other type of special purpose processing unit or co-processor.

As shown, the system data bus 1636 connects the CPU 1626, the input devices 1630, the system memory 1604, and the graphics processing system 1602. In alternate embodiments, the system memory 1604 may connect directly to the CPU 1626. The CPU 1626 receives user input from the input devices 1630, executes programming instructions stored in the system memory 1604, operates on data stored in the system memory 1604, and configures the graphics processing system 1602 to perform specific tasks in the graphics pipeline. The system memory 1604 typically includes dynamic random access memory (DRAM) employed to store programming instructions and data for processing by the CPU 1626 and the graphics processing system 1602. The graphics processing system 1602 receives instructions transmitted by the CPU 1626 and processes the instructions to perform various operations inside the computing system 1600.

As also shown, the system memory 1604 includes an application program 1612, an API 1618 (application programming interface), and a graphics processing unit driver 1622 (GPU driver). The application program 1612 generates calls to the API 1618 to produce a desired set of results. For example the application program 1612 also transmits programs to the API 1618 to perform shading operations, artificial intelligence operations, or graphics rendering operations. The API 1618 functionality may be typically implemented within the graphics processing unit driver 1622. The graphics processing unit driver 1622 is configured to translate the high-level shading programs into machine code.

The graphics processing system 1602 includes a GPU 1610 (graphics processing unit), an on-chip GPU memory 1616, an on-chip GPU data bus 1632, a GPU local memory 1606, and a GPU data bus 1634. The GPU 1610 is configured to communicate with the on-chip GPU memory 1616 via the on-chip GPU data bus 1632 and with the GPU local memory 1606 via the GPU data bus 1634. The GPU data bus 1634 may utilized one or more of the encoding techniques described herein.

The GPU 1610 may receive instructions transmitted by the CPU 1626 and store results in the GPU local memory 1606. Subsequently, if the instructions were graphics instructions, the GPU 1610 may display certain graphics images stored in the GPU local memory 1606 on the display devices 1628.

The GPU 1610 includes one or more logic blocks 1614. The operation of the logic blocks 1614 may implement embodiments of the encoding schemes described herein. The logic blocks 1614 may be loaded on the GPU as instructions or may be implemented in circuitry as instruction set architecture features, or a combination of both of these.

The GPU 1610 may be provided with any amount of on-chip GPU memory 1616 and GPU local memory 1606, including none, and may employ on-chip GPU memory 1616, GPU local memory 1606, and system memory 1604 in any combination for memory operations. The data/instruction busses between these memories and the GPU 1610 may utilize one or more of the encoding techniques described herein.

The on-chip GPU memory 1616 is configured to include GPU programming 1620 and on-Chip Buffers 1624. The GPU programming 1620 may be transmitted from the graphics processing unit driver 1622 to the on-chip GPU memory 1616 via the system data bus 1636. The system data bus 1636 may utilize one or more of the encoding techniques described herein.

By way of example, the GPU programming 1620 may include a machine code vertex shading program, a machine code geometry shading program, a machine code fragment shading program, an artificial intelligence program, or any number of variations of each. The on-Chip Buffers 1624 are typically employed to store data that requires fast access to reduce the latency of such operations.

The GPU local memory 1606 typically includes less expensive off-chip dynamic random access memory (DRAM) and is also employed to store data and programming employed by the GPU 1610. As shown, the GPU local memory 1606 includes a frame buffer 1608. The frame buffer 1608 stores data for at least one two-dimensional surface that may be employed to drive the display devices 1628. Furthermore, the frame buffer 1608 may include more than one two-dimensional surface so that the GPU 1610 can render to one two-dimensional surface while a second two-dimensional surface is employed to drive the display devices 1628.

The display devices 1628 are one or more output devices capable of emitting a visual image corresponding to an input data signal. For example, a display device may be built using a cathode ray tube (CRT) monitor, a liquid crystal display, or any other suitable display system. The input data signals to the display devices 1628 are typically generated by scanning out the contents of one or more frames of image data that is stored in the frame buffer 1608.

The specific voltages, amperages, and other details described above are for illustrative purposes only. The invention may be practiced using a variety of specific voltage levels, currents, resistances, and so forth. And while the invention has been described above in the context of e.g. a processor transmitting data to a memory, the PAM-4 etc. signaling techniques described herein may be practiced in any of a wide variety of signaling systems in which data is sent from a transmitting device to a receiving device, or between transceiving devices, and so forth.

Terms used herein should be accorded their ordinary meaning in the relevant arts, or the meaning indicated by their use in context, but if an express definition is provided, that meaning controls.

"Logic" herein refers to machine memory circuits, non-transitory machine-readable media, and/or circuitry that by way of its material and/or material-energy configuration comprises control and/or procedural signals, and/or settings and values (such as resistance, impedance, capacitance, inductance, current/voltage ratings, etc.), that may be applied to influence the operation of a device. Electronic circuits such as controllers, field programmable gate arrays, processors, and memory (both volatile and nonvolatile) comprising processor-executable instructions are examples of logic. Logic specifically excludes pure signals or software per se (however does not exclude machine memories comprising software and thereby forming configurations of matter).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will appreciate that logic may be distributed throughout one or more devices or components, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. A method of driving a serial data bus with voltage signals corresponding to a series of data bits, the method comprising:
    dividing the series of data bits into sequences of a number of bits, the number of bits based on a number of voltage levels, N, utilized in a PAM-N symbol;
    encoding a first number of bits of each of the sequences onto the serial data bus as one of N discrete voltage levels (an N-level symbol), the first number of bits being the base-2 logarithm of N;
    encoding a next number of bits of each of the sequences onto the data bus each as one of M discrete voltage levels (two M-level symbols), the next number of bits being log 2 $[(N^2)/2]$ and M being an integer equal to a ceiling function applied to a square root of $[(N^2)/2]$; and
    communicating the N-level symbol and the two M-level symbols on the serial data bus.

2. A method of operating a serial data bus at a plurality of different voltage levels, the method comprising:
    dividing a series of data bits for communication on the serial data bus into a plurality of sequences of five bits each;
    encoding and communicating a first two bits of each of the sequences of five bits on the serial data bus as a four-level symbol tone of four discrete voltage levels);
    encoding and communicating a next three bits of each of the sequences of five bits on the serial data bus as two three-level symbols two voltage signals each being one of three discrete voltage levels); and
    wherein the encoding of the next three bits is a selective encoding of the next three bits of each of the sequences of five bits on the serial data bus on condition that the first two bits of each of the sequences of five bits encodes as a four-level symbol at a highest symbol voltage level or a lowest symbol voltage level utilized by the serial data bus.

3. The method of claim 2, wherein the two three-level symbols are selected to eliminate a possibility of maximum voltage deltas between four-level symbols on the serial data bus.

4. The method of claim 2, wherein the two three-level symbols comprise a first three-level symbol and a second three-level symbol, a voltage level of the first three-level symbol being either (a) at most two voltage steps below a voltage level of the four-level symbol, or (b) at most two voltage steps above the voltage level of the four-level symbol.

5. The method of claim 2, wherein the two three-level symbols comprise a first three-level symbol and a second three-level symbol, and further comprising:
    the sequences of five bits comprising a first sequence of five bits for communication on the serial data bus, and a second sequence of five bits for communication after the first sequence of five bits on the serial data bus; and
    a voltage level of the second three-level symbol of the first sequence of five bits being either (a) at most two voltage steps below a voltage level of the four-level symbol of the second sequence of five bits, or (b) at most two voltage steps above the voltage level of the four-level symbol of the second sequence of five bits.

6. A method of operating a serial data bus at a plurality of different voltage levels, the method comprising:
    dividing a series of data bits for communication on the serial data bus into sequences of seven bits;
    communicating a first four bits of each of the sequences of seven bits on the serial data bus as two four-level symbols; and
    communicating a next three bits of each of the sequences of seven bits on the serial data bus as two three-level symbols.

7. The method of claim 6, wherein the serial data bus comprises a first data lane and a second data lane, and transmission of the two four-level symbols is staggered in time between the first data lane and the second data lane.

8. The method of claim 7, wherein staggering the transmission of the two four-level symbols between the first data lane and the second data lane comprises transmission of two four-level symbols for the first data lane different during a different clock interval than transmission of two four-level symbols for the second data lane.

9. The method of claim 6, further comprising:
   selectively encoding the next three bits of each of the sequences of seven bits on the serial data bus on condition that a second two bits of each of the sequences of seven bits encodes as a four-level symbol at a highest symbol voltage level or a lowest symbol voltage level utilized by the serial data bus.

10. The method of claim 6, wherein the two three-level symbols comprise a first three-level symbol and a second three-level symbol, a voltage level of the first three-level symbol being either (a) at most two voltage steps below a voltage level of a second one of the two four-level symbols, or (b) at most two voltage steps above the voltage level of the second one of the two four-level symbols.

11. The method of claim 6 wherein the two three-level symbols comprise a first three-level symbol and a second three-level symbol, and further comprising:
    the sequences of seven bits comprising a first sequence of seven bits for communication on the serial data bus, and a second sequence of seven bits for communication on the serial data bus after the communication of the first sequence of seven bits on the serial data bus; and
    a voltage level of the second three-level symbol of the first sequence of seven bits being either (a) at most two voltage steps below a voltage level of a second one of the two four-level symbols of the first sequence of seven bits, or (b) at most two voltage steps above the second one of the two four-level symbols of the first sequence of seven bits.

12. A serial data bus transmitter comprising:
    a plurality of line driver circuits;
    logic coupled to the line driver circuits to communicate a first two bits of a sequence of five bits as a four-level symbol and to communicate a next three bits of each of the sequences of five bits as two three-level symbols; and
    wherein the next three bits are communicated as the two three-level symbols on condition that that the first two bits of each of the sequence of five bits are communicated as a four-level symbol at a highest voltage level or a lowest voltage level utilized on the serial data bus.

13. The serial data bus transmitter of claim 12, wherein the two three-level symbols comprise a first three-level symbol and a second three-level symbol and a voltage level of the first three-level symbol is at most two voltage steps below a voltage level of the four-level symbol.

14. The serial data bus transmitter of claim 12, wherein the two three-level symbols comprise a first three-level symbol and a second three-level symbol and a voltage level of the first three-level symbol is at most two voltage steps above the voltage level of the four-level symbol.

15. The serial data bus transmitter of claim 12, wherein the two three-level symbols comprise a first three-level symbol and a second three-level symbol; and
    the serial data bus transmitter further comprises logic to set a voltage level of the second three-level symbol of a first sequence of five bits to at most two voltage steps below a voltage level of the four-level symbol of a second sequence of five bits.

16. The serial data bus transmitter of claim 12, wherein the two three-level symbols comprise a first three-level symbol and a second three-level symbol; and
    the serial data bus transmitter further comprises logic to set a voltage level of the second three-level symbol of a first sequence of five bits to at most two voltage steps above a voltage level of the four-level symbol of the second sequence of five bits.

17. A serial data bus transmitter comprising:
    a plurality of serial data lines; and
    logic coupled to the line driver circuits to:
        divide a series of data bits for communication on the serial data bus into sequences of seven bits;
        communicate a first four bits of each of the sequences of seven bits on the serial data bus as two four-level symbols; and
        communicate a next three bits of each of the sequences of seven bits onto the serial data bus as two three-level symbols.

* * * * *